(12) United States Patent
Uhling et al.

(10) Patent No.: US 12,047,264 B2
(45) Date of Patent: Jul. 23, 2024

(54) DETERMINING NETWORK RELIABILITY USING MESSAGE SUCCESS RATES

(71) Applicant: ITRON, INC., Liberty Lake, WA (US)

(72) Inventors: Thomas F. Uhling, Spokane Valley, WA (US); Keith Wayne Barnes, Waseca, MN (US)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 17/402,245

(22) Filed: Aug. 13, 2021

(65) Prior Publication Data

US 2023/0045907 A1   Feb. 16, 2023

(51) Int. Cl.
  *H04L 43/0823* (2022.01)
  *H04L 43/062* (2022.01)
  (Continued)

(52) U.S. Cl.
  CPC ........ *H04L 43/0847* (2013.01); *H04L 43/062* (2013.01); *H04L 43/0894* (2013.01);
  (Continued)

(58) Field of Classification Search
  CPC ............... H04L 43/0847; H04L 43/062; H04L 43/0894; H04L 43/16; H04W 24/08; H04W 24/10
  See application file for complete search history.

(56) References Cited

U.S. PATENT DOCUMENTS 8,274,910 B2   9/2012   Chen et al.
9,565,625 B1   2/2017   MacNeille et al.
(Continued)

FOREIGN PATENT DOCUMENTS

WO   2020/067982 A1   4/2020

OTHER PUBLICATIONS

Vasseur et al., "Routing Metrics Used for Path Calculation in Low-Power and Lossy Networks", Internet Engineering Task Force (IETF), Mar. 2012, 30 pages.
(Continued)

*Primary Examiner* — Hitesh Patel
*Assistant Examiner* — Eui H Kim
(74) *Attorney, Agent, or Firm* — Artegis Law Group, LLP

(57) ABSTRACT

One embodiment of the present invention sets forth a technique for evaluating connections between nodes in a mesh network. The technique includes determining, at a first node, one or more first accumulated message success rates associated with transmitting messages from the first node to a target destination within the mesh network via an established parent node and with receiving messages from the target destination via the established parent node; determining, based on the one or more first accumulated message success rates, that a search for a different parent node should be performed; identifying a plurality of potential parent nodes; computing, for each potential parent node, one or more second accumulated message success rates associated with transmitting messages from the first node to a target destination within the mesh network via the potential parent node and with receiving messages from the target destination via the potential parent node; and based on the second accumulated message success rates, selecting a new parent node from the plurality of potential parent nodes or maintaining the established parent node.

20 Claims, 13 Drawing Sheets

(51) Int. Cl.
*H04L 43/0894* (2022.01)
*H04L 43/16* (2022.01)
*H04W 24/08* (2009.01)
*H04W 24/10* (2009.01)

(52) U.S. Cl.
CPC ............ *H04L 43/16* (2013.01); *H04W 24/08* (2013.01); *H04W 24/10* (2013.01)

(56) References Cited

U.S. PATENT DOCUMENTS

| | | | |
|---|---|---|---|
| 9,893,971 | B1 | 2/2018 | Singh et al. |
| 10,341,935 | B2 | 7/2019 | Khalife et al. |
| 10,536,861 | B2 | 1/2020 | Doherty et al. |
| 2002/0049561 | A1 | 4/2002 | Garcia-Luna-Aceves et al. |
| 2003/0191841 | A1 | 10/2003 | DeFerranti et al. |
| 2007/0291689 | A1 | 12/2007 | Kapur et al. |
| 2008/0037431 | A1 | 2/2008 | Werb et al. |
| 2008/0068217 | A1 | 3/2008 | Van Wyk et al. |
| 2008/0069118 | A1 | 3/2008 | Monier |
| 2008/0084330 | A1 | 4/2008 | Picard |
| 2008/0205420 | A1* | 8/2008 | Srikrishna ............ H04W 40/22 370/401 |
| 2009/0135738 | A1 | 5/2009 | Mhatre et al. |
| 2010/0195574 | A1 | 8/2010 | Richeson et al. |
| 2010/0254364 | A1 | 10/2010 | Yi et al. |
| 2010/0278187 | A1 | 11/2010 | Hart et al. |
| 2011/0164527 | A1 | 7/2011 | Mishra et al. |
| 2011/0188452 | A1 | 8/2011 | Borleske et al. |
| 2012/0327789 | A1 | 12/2012 | Grenier et al. |
| 2013/0159550 | A1 | 6/2013 | Vasseur |
| 2013/0198305 | A1 | 8/2013 | Veillette |
| 2013/0227022 | A1 | 8/2013 | Trivedi et al. |
| 2014/0036702 | A1 | 2/2014 | Van Wyk et al. |
| 2014/0313909 | A1* | 10/2014 | Doherty ............... H04W 24/02 370/252 |
| 2014/0369212 | A1 | 12/2014 | Raravi et al. |
| 2015/0208316 | A1 | 7/2015 | Mosko et al. |
| 2015/0319629 | A1* | 11/2015 | Dabirmoghaddam ....................... H04W 28/04 370/252 |
| 2016/0021613 | A1* | 1/2016 | Mani ..................... G01D 4/002 370/311 |
| 2016/0269260 | A1* | 9/2016 | Kazmi ..................... H04L 1/20 |
| 2016/0295355 | A1 | 10/2016 | Yuan et al. |
| 2017/0053258 | A1* | 2/2017 | Carney .................. H04L 43/08 |
| 2017/0070941 | A1 | 3/2017 | Veillette |
| 2017/0099218 | A1 | 4/2017 | Holcombe et al. |
| 2017/0289919 | A1* | 10/2017 | Kurihara ............ H04W 52/241 |
| 2018/0091989 | A1 | 3/2018 | Baroudi et al. |
| 2018/0139679 | A1 | 5/2018 | Astrom et al. |
| 2018/0324609 | A1 | 11/2018 | Diancin |
| 2019/0058532 | A1* | 2/2019 | Nagaraja ................ H04B 17/24 |
| 2019/0098606 | A1 | 3/2019 | Sharma et al. |
| 2019/0174389 | A1 | 6/2019 | Kamp et al. |
| 2019/0363965 | A1 | 11/2019 | Tewari et al. |
| 2019/0394737 | A1 | 12/2019 | Luo |
| 2020/0068656 | A1 | 2/2020 | Yang et al. |
| 2020/0084690 | A1 | 3/2020 | Sakata et al. |
| 2020/0092791 | A1 | 3/2020 | Arvidson et al. |
| 2020/0099616 | A1 | 3/2020 | Nguyen et al. |
| 2020/0187282 | A1 | 6/2020 | Yu et al. |
| 2020/0204487 | A1 | 6/2020 | Woodland |
| 2020/0205199 | A1 | 6/2020 | Newman et al. |
| 2020/0404513 | A1 | 12/2020 | Hayes et al. |
| 2021/0007180 | A1* | 1/2021 | Hou ......................... H04B 3/46 |
| 2021/0029653 | A1 | 1/2021 | Zhang et al. |
| 2021/0120082 | A1 | 4/2021 | Harris |
| 2021/0160758 | A1 | 5/2021 | Huang et al. |
| 2021/0274449 | A1 | 9/2021 | Choi et al. |
| 2021/0336879 | A1 | 10/2021 | Nguyen |
| 2022/0007235 | A1 | 1/2022 | Liu et al. |
| 2022/0369160 | A1 | 11/2022 | Jamil et al. |

OTHER PUBLICATIONS

Non Final Office Action received for U.S. Appl. No. 17/402,221 dated Mar. 11, 2022, 51 pages.
Non Final Office Action received for U.S. Appl. No. 17/402,231 dated Apr. 20, 2022, 23 pages.
International Search Report for application No. PCT/US2022/040233 dated Nov. 1, 2022.
International Search Report for application No. PCT/US2022/040236 dated Nov. 30, 2022.
International Search Report for application No. PCT/US2022/040224 dated Nov. 30, 2022.
International Search Report for application No. PCT/US2022/040228 dated Dec. 8, 2022.
De Leon et al., "An Experimental Performance Evaluation of Bluetooth Mesh Technology for Monitoring Applications", IEEE Wireless Communications and Networking Conference (WCNC), DOI: 10.1109/WCNC45663.2020.9120762, 2020, 6 pages.
Ali et al., "Performance Evaluation of Heterogeneous IoT Nodes With Differentiated QoS in IEEE 802.11ah RAW Mechanism", IEEE Transactions on Vehicular Technology, DOI: 10.1109/TVT.2019.2897127, vol. 68, No. 4, Apr. 2019, pp. 3905-3918.
Notice of Allowance received for U.S. Appl. No. 17/402,221 dated Jun. 20, 2022, 14 pages.
Final Office Action received for U.S. Appl. No. 17/402,231 dated Oct. 5, 2022, 39 pages.
Non Final Office Action received for U.S. Appl. No. 17/402,231 dated Feb. 14, 2023, 38 pages.
Non Final Office Action received for U.S. Appl. No. 17/961,446 dated Mar. 22, 2023, 55 pages.
Non Final Office Action received for U.S. Appl. No. 17/402,211 dated Apr. 27, 2023, 31 pages.
Final Office Action received for U.S. Appl. No. 17/961,446 dated Oct. 16, 2023, 67 pages.
Notice of Allowance received for U.S. Appl. No. 17/402,211 dated Oct. 23, 2023, 24 pages.
Advisory Action received for U.S. Appl. No. 17/402,231 dated Oct. 23, 2023, 4 pages.
Non Final Office Action received for U.S. Appl. No. 17/402,231 dated Dec. 13, 2023, 38 pages.
Final Office Action received for U.S. Appl. No. 17/402,231 dated Aug. 8, 2023, 41 pages.
Non Final Office Action received for U.S. Appl. No. 17/961,446 dated Mar. 13, 2024, 61 pages.
Notice of Allowance received for U.S. Appl. No. 17/402,231 dated Apr. 10, 2024, 21 pages.

\* cited by examiner

DETERMINING NETWORK RELIABILITY USING MESSAGE SUCCESS RATES

BACKGROUND

Field of the Various Embodiments

Various embodiments of the present disclosure relate generally to computer science and mesh networking and, more specifically, to determining network reliability using message success rates.

Description of the Related Art

A conventional utility distribution infrastructure typically includes multiple consumers (e.g., houses, business, etc.) coupled to a set of intermediate distribution entities. The distribution entities draw resources from upstream providers and distribute the resources to the downstream consumers. In a modern utility distribution infrastructure, the consumers and/or intermediate distribution entities may include Internet-of-Things (IoT) devices, such as smart utility meters and other network-capable hardware. These IoT devices can include battery-powered devices (BPDs) that draw power from an internal battery and/or mains-powered devices (MPDs) that draw power from mains electricity, a power grid, and/or other external power source. Among other things, these IoT devices measure the consumption levels of various resources to generate related metrology data and periodically report the metrology data across the Internet and/or other networks to a centralized management facility, often referred to as a "back office."

In many cases, the back office performs various management operations for the utility distribution infrastructure on behalf of one or more customers. For example, a customer could include a utility company or other corporate entity that owns and/or operates all or part of the utility distribution infrastructure. Typically, the back office periodically collects metrology data associated with the utility distribution infrastructure and provides that data to customers. For example, the back office could obtain metrology data from a set of IoT devices every eight hours indicating utility consumption over an eight-hour interval. The back office also occasionally initiates on-demand read requests to read metrology data from one or more specific IoT devices at the behest of the customer. For example, the customer could require a final utility meter reading from a smart utility meter located at a recently sold residence to prorate a utility bill. In such a situation, the back office would transmit an on-demand read request to that smart meter to cause the smart meter to report the current meter reading. An important objective of the utility distribution infrastructure, therefore, is to reliability retrieve metrology data from the IoT devices.

In some implementations, instead of communicating directly with the back office, a group of IoT devices may establish an ad-hoc mesh network and route communications to the back office through the mesh network. Such a mesh network is typically formed by establishing communication links between pairs of IoT devices that reside relatively close to one another. The IoT devices then use the communication links within the mesh network to exchange and/or aggregate metrology data, propagate commands, and/or participate in other decisions or actions. Thus, in order to reliably send data to the back office and receive messages from the back office, the IoT devices need to establish and maintain reliable communication paths through the mesh network and to and from the back office.

One approach for evaluating the quality of a connection between two nodes of a mesh network is to evaluate the received signal strength indication (RSSI) associated with the communication link between the nodes. The RSSI is a measure of the strength of the signal that one of the nodes is receiving from the other node. As a general matter, a lower RSSI indicates that the communication link has weaker signal strength and, therefore, is a less reliable connection. However, one drawback of using RSSIs is that a given node can use an RSSI only to estimate whether that node is reliably receiving messages from a second node. Notably, the RSSI does not indicate whether the second node is reliably receiving messages that are being transmitted by the given node or whether the second node is reliably receiving messages that are directed to the given node. Additionally, a path from the given node to a target destination typically includes multiple intermediary connections, such as connections between the second node and its neighbors. The RSSI does not indicate the quality or reliability of these intermediary connections. Therefore, if the second node is not reliably receiving messages and/or if any of the intermediary connections are not reliable, then messages to and from the given node may not be reliably received even though the RSSI indicates that the communication link between the given node and the second node is reliable.

Another approach for evaluating the quality of a connection between two nodes of a mesh network is to perform active link evaluation. During active link evaluation, a given node exchanges a series of messages with a second node over an evaluation period. One or more link evaluation metrics, such as an expected transmission count (ETX) or a link quality level (LQL), are calculated based on the messages. Similar to RSSIs, these link evaluation metrics generally indicate the quality of the connection between the given node and the second node. However, one drawback of using link evaluation metrics is that sending and receiving many different messages during an evaluation period requires that BPD nodes burn reasonably substantial amounts of power, which can reduce the overall battery life of the BPDs. Further, similar to RSSIs, link evaluation metrics indicate only the quality of the direct connection between the given node and the second node and do not indicate the quality of any intermediary connections to and from a target destination.

As the foregoing illustrates, what is needed in the art are more effective techniques for evaluating connection quality between the different nodes of a mesh network.

SUMMARY

In various embodiments, a computer-implemented method for evaluating connections between nodes in a mesh network comprises determining, at a first node, one or more first accumulated message success rates associated with transmitting messages from the first node to a target destination within the mesh network via an established parent node and with receiving messages from the target destination via the established parent node; determining, based on the one or more first accumulated message success rates, that a search for a different parent node should be performed; identifying a plurality of potential parent nodes; computing, for each potential parent node, one or more second accumulated message success rates associated with transmitting messages from the first node to a target destination within the mesh network via the potential parent node and with receiving messages from the target destination via the potential parent node; and based on the second accumulated message success rates, selecting a new parent node from the plurality of potential parent nodes or maintaining the established parent node.

One technical advantage of the disclosed techniques relative to the prior art is that the disclosed techniques enable a given node within a mesh network to evaluate connection quality between itself and a neighbor node based on both the quality of the direct connection between itself and the neighbor node as well as the quality of the intermediary connections along a path from itself to a target destination. Accordingly, with the disclosed techniques, a given node in a mesh network is able to account for message transmission reliability both to and from a target destination when evaluating connection quality between itself and one or more neighboring nodes. Another technical advantage is that the disclosed techniques enable a given node within a mesh network to evaluate connection quality using a relatively small number messages between itself and various neighbor nodes. Accordingly, the disclosed techniques, when implemented, reduce power consumption and resource overhead for a given node relative to conventional approaches that require a node to exchange numerous messages with neighboring nodes. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
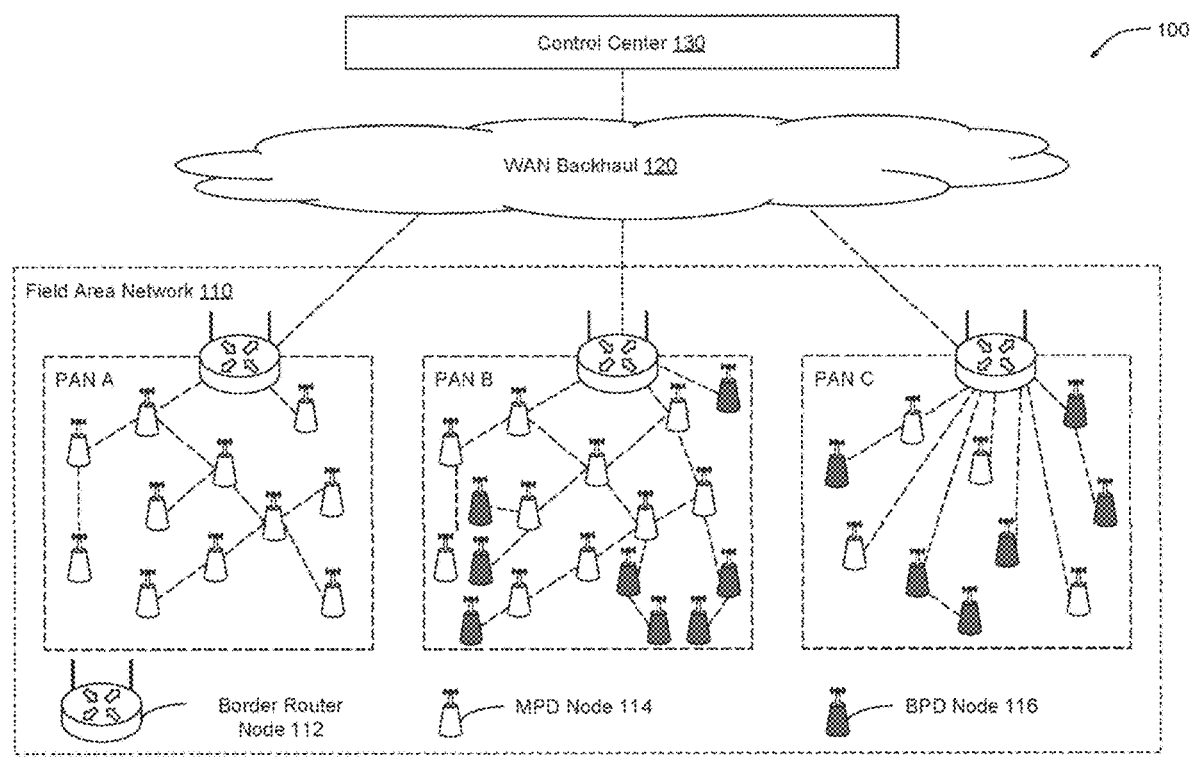
FIG. 1 illustrates a network system configured to implement one or more aspects of various embodiments.

FIG. 1 is a block diagram of a network system 100 configured to implement one or more aspects of various embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. It will be appreciated that PANs A, B, or C can be organized according to other network topologies or structures. For example, one or more PANs could be configured in a tree-like network structure, such as a Destination Oriented Directed Acyclic Graph (DODAG) with parent nodes, child nodes, and a root node.

Each of PANs A, B, and C includes at least one border router node 112 and one or more mains powered device (MPD) nodes 114. PANs B and C further include one or more battery powered device (BPD) nodes 116.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down for extended periods of time in order to conserve battery power. MPD nodes 114 and BPD nodes 116 are configured to gather sensor data, process the sensor data, and communicate data processing results and other information to control center 130. Border router nodes 112 operate as access points to provide MPD nodes 114 and BPD nodes 116 with access to control center 130.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein. However, these routes are generally not known by the nodes unless a dedicated protocol is implemented by the nodes, in addition to the protocol used to manage each PAN. Conversely, routes that link nodes within a given PAN are typically known (e.g., via the protocol used to manage the PAN) by the nodes in the PAN and allow nodes within the PAN to communicate with one another.

Control center 130 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Any of border router nodes 112, MPD nodes 114, and BPD nodes 116 additionally include functionality to communicate directly with one or more adjacent nodes via bi-directional communication links. The communication links may be wired or wireless links, although in practice, adjacent nodes of a given PAN or across multiple PANs exchange data with one another by transmitting data packets via wireless radio frequency (RF) communications.

Each node within a given PAN may implement a discovery protocol to identify one or more adjacent nodes, or "neighbors." A node that has identified a spatially adjacent, neighboring node may establish a bi-directional communication link with the neighboring node. For example, a node that has discovered another node could exchange media access control (MAC) addresses and schedule future communications with the other node based on those MAC addresses. Each neighboring node could update a respective neighbor table to include information concerning the other node, including the MAC address of the other node as well as a received signal strength indication (RSSI) of the communication link established with that node.

In one embodiment, nodes may implement the discovery protocol to determine the hopping sequences of adjacent nodes. The hopping sequence of a node is the sequence of RF channels across which the node periodically receives data. As is known in the art, a channel may correspond to a particular range of frequencies.

Once adjacency is established between nodes, any of those nodes can communicate with any of the other nodes via one or more intermediate nodes and one or more communications links associated with the intermediate node(s). In other words, communication links between adjacent nodes that have discovered one another may be used by the nodes to form a mesh network, independent of network topologies or structures associated with individual PANs A, B, or C. Nodes in the mesh network may additionally communicate with one another via the communication links in the mesh network instead of relying on the network structures and/or connections in WAN backhaul 120 or PANs A, B, or C. For example, communications links established between one or more nodes in PAN A and one or more nodes in PAN B, and between one or more nodes in PAN B and one or more nodes in PAN C, could be used to transmit Internet protocol (IP) packets, command messages, metrology data, and/or other technically feasible data units between or among nodes in the mesh network without routing the data through WAN backhaul 120.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse to reach the destination node. In one embodiment, each intermediate node may include a forwarding database indicating various network routes and cost metrics associated with each route.

Figure 2:
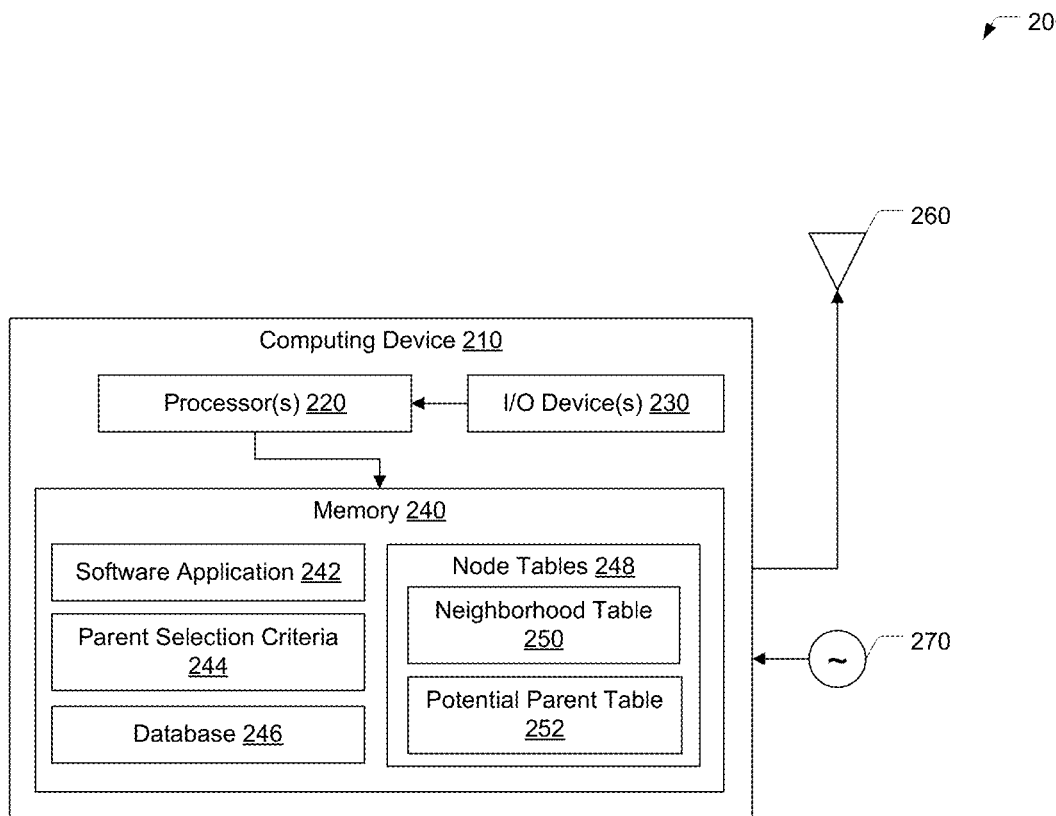
FIG. 2 illustrates a node configured to operate within the network system of FIG. 1, according to various embodiments.

Nodes may include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates an exemplary node that may operate within the network system 100.

FIG. 2 illustrates a node 200 configured to transmit and receive data within the network system 100 of FIG. 1, according to various embodiments. In some embodiments, node 200 can be used to implement any of border router nodes 112, MPD nodes 114, and/or BPD nodes 116 of FIG. 1.

As shown, a node 200 includes a computing device 210 coupled to a transceiver 260 and an oscillator 270. Computing device 210 coordinates the operations of the node device 200. Transceiver 260 is configured to transmit and receive message data packets across network system 100 using a range of channels and power levels. In some embodiments, transceiver 260 includes one or more radios implemented in hardware and/or software to provide two-way RF communications with other nodes in network system 100 via one or more communications links. In some embodiments, transceiver 260 may also, or instead, include a cellular modem that is used to transmit and receive data with a cellular base station via a corresponding link.

Oscillator 270 provides one or more oscillation signals according to which the transmission and reception of message data packets can be scheduled. Each node 200 can further include various analog-to-digital (A/D) and digital-to-analog (D/A) converters, digital signal processors (DSPs), harmonic oscillators, transceivers, and any other components generally associated with RF-based communication hardware (not shown).

Each node 200 includes computing device hardware configured to perform processing operations and execute program code. As shown, computing device 210 includes one or more processors 220, one or more input/output (I/O) devices 230, and memory 240, coupled together. The one or more processors 220 may include any hardware configured to process data and execute software applications. In general, the one or more processors 220 retrieve and execute programming instructions stored in the memory 240. I/O devices 230 include devices configured to both receive input and provide output.

The one or more processors 220 can be any technically-feasible processing device configured to process data and execute program instructions. For example, the one or more processors 220 could include one or more central processing units (CPUs), DSPs, graphics processing units (CPUs), application-specific integrated circuits (ASICs), field-programmable gate arrays (FPGAs), microprocessors, microcontrollers, other types of processing units, and/or a combination of different processing units. In some embodiments, the one or more processors are coupled to a real-time clock (RTC) (not shown), according to which the one or more processors maintain an estimate of the current time.

Memory 240 includes one or more units that store data and/or program instructions. Memory 240 can be implemented by any technically-feasible storage medium. For example, memory 140 could include a random-access memory (RAM) module, a flash memory unit, and/or other type of memory unit. The one or more processors 220, transceiver 260, and/or other components of node 200 include functionality to read data from and write data to memory 240. As shown, memory 240 stores a software application 242, parent selection criteria 244, database 246, and one or more node tables 248. The software application 242 includes program instructions that, when executed by the one or more processors 220, performs any one or more of the computer-based techniques described herein.

In some embodiments, the software application 242 can interface with the transceiver 260 to coordinate the transmission and reception of message data packets and/or periodic beacons across the network system 100 based on timing signals generated by the oscillator 270. Database 246 includes various data and data structures retrieved by and/or stored by the software application 242. For example, database 246 could include node data (e.g., security keys, media access control (MAC) addresses of neighboring node devices, etc.) and/or network data (e.g., network performance metrics, cost metrics, etc.). In various embodiments, the one or more node tables 248 may be stored in the database 246.

As discussed in further detail below, software application 242 is configured to determine message success rates associated with the connections between node 200 and the neighboring nodes within FAN 110 and evaluate the connections based on the message success rates. A message success rate indicates the probability that messages to and from node 200 will be successfully transmitted and received when using the associated connection. In some embodiments, the message success rates include one or more of a local uplink message success rate, a local downlink message success rate, an accumulated uplink message success rate, or an accumulated downlink message success rate. The local uplink message success rate indicates the probability that messages transmitted to a parent node from node 200 will be successfully received by the parent node. The local downlink message success rate indicates the probability that messages transmitted from the parent node to node 200 will be successfully received by node 200. The accumulated uplink message success rate indicates the probability that messages transmitted to a target destination from node 200, via the connection to the parent node, will be successfully received by the target destination. The accumulated downlink message success rate indicates the probability that messages transmitted from the target destination, via the connection to the parent node, will be successfully received by node 200.

In some embodiments, node 200 uses the software application 242 to connect to and communicate with other nodes 112, 114, and 116 in FAN 110. For example, node 200 can execute software application 242 in order to connect to and communicate with a BPD node 116 or a MPD node 114 within the FAN 110. When joining the FAN 110, a node 200 can use the software application 242 to perform a discovery process with one or more nodes, such as BPD nodes 116 or MPD nodes 114, to discover a group of potential parent nodes. Software application 242 is configured to determine message success rates associated with the connections between node 200 and the potential parent nodes. In some embodiments, software application 242 is configured to identify a specific BPD node 116 or MPD node 114 as a target parent node based on the one or more message success rates. In some embodiments, software application 242 is configured to periodically evaluate the quality of an established connection to a parent node by determining message success rates associated with the established connection to the parent node. Software application 242 is configured to determine whether a different parent should be selected for node 200 based on the message success rates. If software application 242 determines that a different parent node should be selected, then software application 242 is configured to discover a group of potential parent nodes and re-select a parent node from the group of potential parent nodes.

Parent selection criteria 244 includes one or more sets of criteria that software application 242 uses to determine a specific node to select as a parent node. In some embodiments, the parent selection criteria 244 includes a hierarchy of distinct criterion, where each criterion is associated with a specific metric or set of metrics. Software application 242 uses each criterion in the hierarchy in a multi-step filtering process in order to identify, from a set of neighboring nodes, a specific node as a target parent node. In some embodiments, the parent selection criteria 244 includes one or more criterion for selecting and/or filter potential parent nodes based on message success rates, such as threshold values for accumulated uplink message success rates, threshold values for accumulated downlink message success rates, threshold values for combined accumulated message success rates, and the like.

In some embodiments, software application 242 produces and/or maintains one or more node tables 248, in order to assist in the managing of connections to other nodes in FAN 110. In some embodiments, software application 242 adds, removes, and/or updates entries that are included in a given node table 248 in order to manage communications with one or more nodes in network 110. In some embodiments, software application 242 stores node information associated with the other nodes in FAN 110, such as a node identifier, MAC address, hop count value(s), average RSSI value, LSI value, and the like. In some embodiments, software application 242 computes one or more message success rates associated with a node and stores the one or more message success rates in an entry corresponding to the node in a node table 248. In some embodiments, software application 242 stores success rate information that is used to compute the one or more message success rates, such as a number of attempts to receive messages, a number of messages received, neighbor success rate information, neighbor message success rates, and the like.

In some embodiments, the one or more node tables include a neighborhood table (NHT) 250 for storing information associated with neighboring nodes of node 200, such as one or more parent nodes of node 200 and/or one or more child nodes of node 200. Software application 242 generates an entry in NHT 250 for each neighboring. In some embodiments, the one or more node tables include a potential parent table (PPT) 252 for storing information associated with potential parent nodes of node 200. When node 200 joins the network 110, software application 242 generates an entry in PPT 252 for each node that software application 242 determines is within a threshold range of node 200. For example, software application 242 may cause node 200 to transmit one or more discovery beacons and generate an entry in PPT 252 for each node for which a discovery response message was received within a threshold time period.

Figure 3:
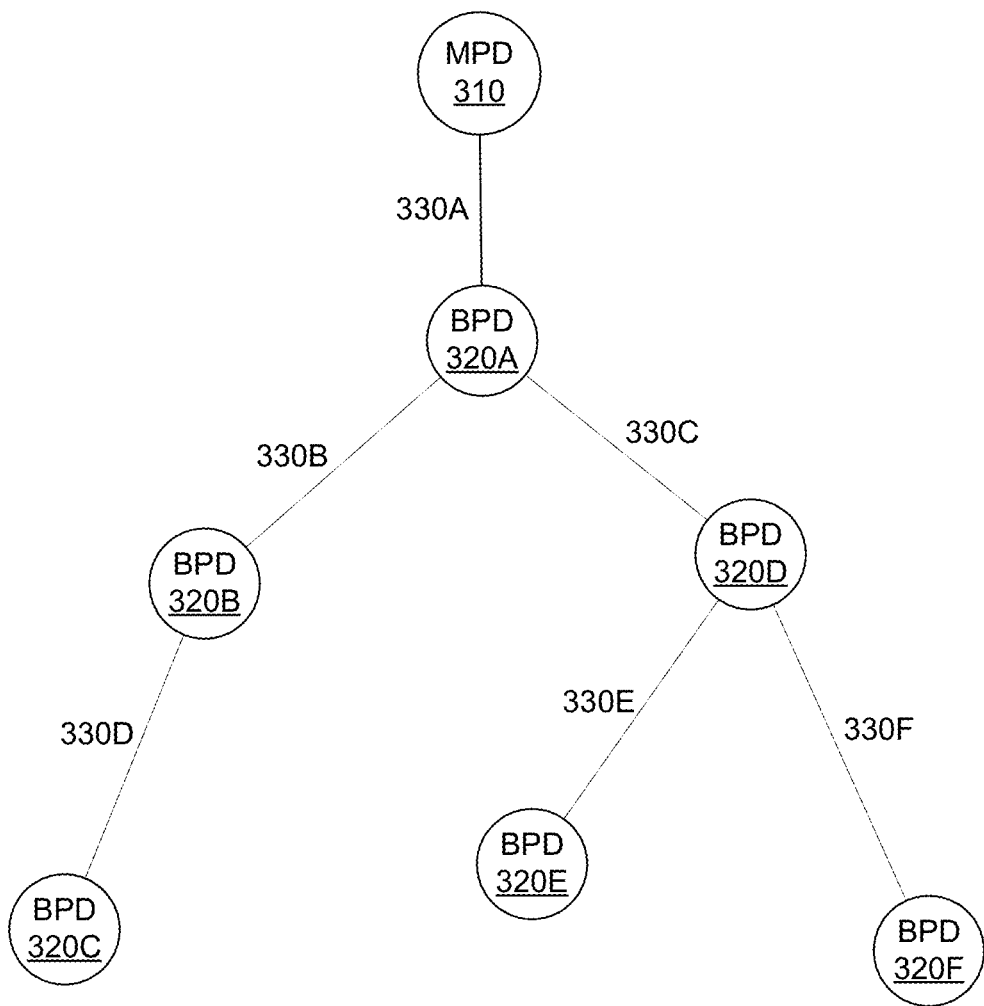
FIG. 3 illustrates a node subtree configured to operate within the network system of FIG. 1, according to various embodiments.

FIG. 3 illustrates a node subtree 300 within the network system 100 of FIG. 1, according to various embodiments. As shown, subtree 300 includes an MPD node 310 and a plurality of BPD nodes 320A-320F.

Each node is configured to communicate directly with one or more adjacent nodes via bi-directional communication links 330, such as communication links 330A-330F. The bi-directional communication links 330 can be wired or wireless links that allow data exchange, such as wireless radio frequency (RF) communications, wireless (Wi-Fi) network, Bluetooth, Wireless USB, and so forth. The communication links 330 can use any technically feasible communication protocol for transmitting and receiving messages between nodes. In some embodiments, communication links 330 between two BPD nodes use a different communication protocol than communication links between a BPD node and a MPD node. For example, communication link 330A could use a first communication protocol, e.g., limited listening schedule (LLS), and communication links 330B-330F could use a second communication protocol, e.g., extended FAN connectivity (EFC). Accordingly, the type, size, and/or format of messages transmitted between two BPD nodes can differ from the type, size, and/or format of messages transmitted between a BPD node and a MPD node.

As shown in FIG. 3, node subtree 300 is organized in a hierarchical graph-like structure. The node subtree 300 includes a single root node, MPD node 310, and one or more child nodes, such as BPD nodes 320A-320F. In some embodiments, a given node establishes a bi-directional communication link 330 with a single parent node. For example, when joining node subtree 300, BPD node 320E may identify BPD nodes 320B, 320C, 320D, and 320F as potential parent nodes, and select a single node, BPD node 320D, as its parent node. After selecting BPD node 320D as its parent node, BPD node 320E establishes a communication link 330E with BPD node 320D and communicates with the other nodes in the network, such as MPD node 310 and BPD nodes 320B, 320C, and 320F, via the communication link 330E.

A path from a child node (e.g., BPD node 320A, BPD node 320B, BPD node 320F) to the root node, includes a direct communication link 330 between the child node and its parent node. Additionally, the path can include one or more intermediary communication links 330 from one or more parent nodes of the child node to the root node. For example, the path from BPD node 320C to MPD node 310 includes communication links 330D, 330B, and 330A. Communication link 330D is a direct communication link from BPD node 320C to its parent, BPD node 320B. Communication link 330B is a direct communication link from BPD node 320B to BPD node 320A. Relative to BPD node 320C, communication link 330B is an intermediary communication link on the path from BPD node 320C to MPD node 310. Similarly, communication link 330A is a direct communication link from BPD node 320A to MPD node 310, and an intermediary communication link relative to BPD nodes 320C and 320B.

Local Message Success Rates

In some embodiments, software application 242 is configured to determine one or more local message success rates associated with the direct connection between a node and its neighboring node. The one or more local message success rates indicate a probability that messages transmitted to the neighboring node and/or messages transmitted from the neighboring node will be received successfully.

In some embodiments, the one or more local message success rates include a local transmitted message success rate. The local transmitted message success rate indicates the probability that messages from the node to its neighboring node, via the direct connection, will be successfully received by the neighboring node. If the neighboring node is a parent node or potential parent node, then the local transmitted message success rate is a local uplink message success rate. The local uplink message success rate indicates the probability that messages from the node to the parent node (i.e., in the uplink direction) will be successfully received by the parent node. For example, a local uplink message success rate for communication link 330B indicates the likelihood that messages sent from BPD node 320B will be successfully received by BPD node 320A.

In some embodiments, the one or more message success rates include a local received message success rate. The local received message success rate indicates the probability that messages to the node from its neighboring node, via the direct connection, will be successfully received by the node. If the neighboring node is a parent node or potential parent node, then the local received message success rate is a local downlink message success rate. The local downlink message success rate indicates the probability that messages to the node from the parent node (i.e., in the downlink direction) will be successfully received by the node. For example, the local downlink message success rate for communication link 330B indicates the likelihood that messages sent from BPD node 320A will be successfully received by BPD node 320B.

As discussed in further detail below, software application 242 uses the one or more local message success rates to evaluate the direct connection between a node and a parent node or potential parent node. For example, if the local uplink message success rate indicates a high probability that messages sent from a node will be successfully received by the parent node and the local downlink message success rate indicates a high probability that messages sent by the parent node will be successfully received by the node, then software application 242 could determine that the direct connection between the node and the parent node is a reliable connection.

Figure 4A:
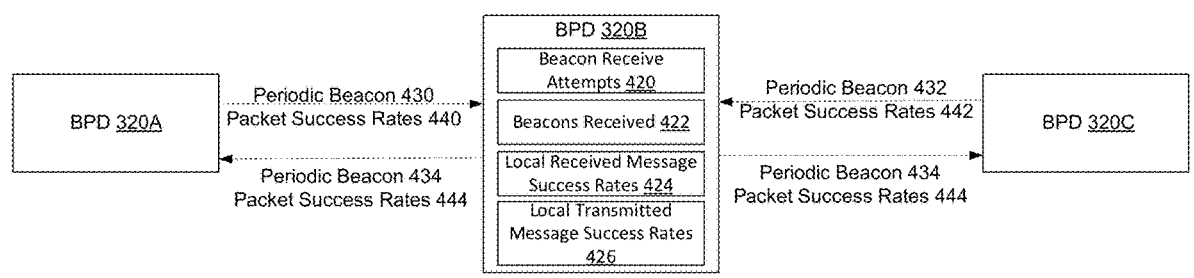
FIG. 4A illustrates data flows for computing local message success rates for nodes of the node subtree of FIG. 3, according to various embodiments.

FIG. 4A is a block diagram illustrating data flows for determining message success rates associated with a direct connection between two BPD nodes, according to one embodiment of the present invention.

As shown in FIG. 4A, BPD node 320B listens for periodic beacons from its neighboring nodes, BPD node 320A and BPD node 320C. BPD nodes 320A and 320C transmit periodic beacons 430 and 432, respectively, to BPD node 320B. Referring to FIG. 3, BPD node 320B listens for periodic beacon 430 via communication link 330B and for periodic beacon 432 via communication link 330D.

In some embodiments, each node transmits periodic beacons during a transmission window. The transmission window for a node can occur at regular intervals and last for the same duration at each interval. The duration of the transmission window, the length of the interval, and/or the start times of the transmission windows may be different for each node. For example, BPD node 320A could be configured to transmit periodic beacons at a first interval starting from a first time, and BPD node 320C could be configured to transmit periodic beacons at a second interval starting from a second time. Additionally, the transmission window for BPD node 320A may be a different length than the transmission window for BPD node 320C. Therefore, the transmission window(s) for BPD node 320A and 320C can occur at different times.

BPD node 320B determines a plurality of listening windows for listening for periodic beacons from BPD nodes 320A and 320C. BPD node 320B determines one or more listening windows, corresponding to one or more transmission windows for BPD node 320A, for listening for periodic beacon 430. BPD node 320B determines one or more listening windows, corresponding to one or more transmission windows for BPD node 320C, for listening for periodic beacon 432.

In some embodiments, BPD node 320B determines the plurality of listening windows for nodes 320A and 320C based on timing information associated with nodes 320A and 320C. The timing information associated with a node indicates, for example, the time of the last received beacon, timing information included in the last received beacon, values for synchronizing timing with the other node, and/or other information that can be used to determine a transmission time of a next periodic beacon. In some embodiments, BPD node 320B stores the timing information associated with each node in a corresponding entry of a node table 248, such as NHT 250. BPD node 320B reads the timing information from the corresponding entries of the node table 248 for BPD nodes 320A and 320C, determines the next transmission time of periodic beacons 430 and 432, and listens for periodic beacons 430 and 432 during the determined transmission times.

As shown in FIG. 4A, while BPD node 320B listens for periodic beacons, BPD node 320B tracks a number of beacon receive attempts 420 and a number of beacons received 422 for each neighboring node. The number of beacon receive attempts 420 indicates a number of times BPD node 320B attempted to receive a periodic beacon from the neighboring node. In some embodiments, the number of beacon receive attempts 420 for a neighboring node corresponds to the number of listening windows in which BPD node 320B listened for periodic beacons. The number of beacons received 422 indicates a number of periodic beacons BPD node 320B successfully received while listening for periodic beacons. For a given neighboring node, the number of beacon receive attempts 420 can differ from the number of beacons received 422. For example, BPD node 320B may listen for a periodic beacon during a listening window but may not receive any periodic beacons during the listening window. Further, the number of beacon receive attempts 420 and/or the number of beacons received 422 can differ between each neighboring node.

In some embodiments, BPD node 320B stores the number of beacon receive attempts 420 and number of beacons received 422 for a neighboring node in a corresponding entry in a node table 248, such as NHT 250. For example, when BPD node 320B listens for a periodic beacon 430, BPD node 320B updates the entry in NHT 250 corresponding to BPD node 320A to reflect the attempt to receive the periodic beacon 430. If BPD node 320B successfully receives the periodic beacon 430, then BPD node 320B updates the corresponding entry in NHT 250 to reflect that the periodic beacon 430 was received.

In some embodiments, BPD node 320B computes a received packet success rate based on the number of beacon receive attempts 420 and number of beacons received 422 for the neighboring node. An example function for computing the received packet success rate, PBRecPSR, is given by equation (1):

$$PBRecPSR = (PBRecSuccess/PBRecAttempts) \times 250 \quad (1)$$

In equation (1), PBRecSuccess corresponds to the value of beacons received 422 for the neighboring node and PBRecAttempts corresponds to the value of beacon receive attempts 420. Accordingly, in equation (1), the received packet success rate represents a ratio between the number of beacons received 422 and the number of beacon receive attempts 420. In some embodiments, the received packet success rate is rounded to the nearest integer value. Additionally, the integer value could be scaled to reflect a desired finer percentage value. For example, as shown in equation (1), scaling the received packet success rate by the value 250 allows the nearest integer value to be in resolution of 0.4% (1/250). Scaling the received packet success rate by 250 allows the received packet success rate to be stored as an integer value, which reduces the amount of memory and/or storage required when storing the received packet success rate.

In some embodiments, BPD node 320B stores the received packet success rate in an entry in NHT 250 corresponding to the neighboring node. In some embodiments, NHT 250 stores an array of received packet success rates comprising different received packet success rates computed for the neighboring node at different times. In some embodiments, the array of received packet success rates is associated with a threshold size. If the number of received packet success rates reaches the threshold size, then storing the received packet success rate includes removing the oldest received packet success rate from the array.

In some embodiments, BPD node 320B transmits a plurality of periodic beacons to one or more neighboring nodes. As shown in FIG. 4A, BPD node 320B transmits periodic beacon 434 to BPD nodes 320A and 320C. In some embodiments, BPD node 320B determines a plurality of transmission windows for transmitting the periodic beacons 434. Each transmission window can occur at regular intervals and last for the same duration at each interval. In some embodiments, BPD node 320B determines the plurality of transmission windows such that the plurality of transmission windows do not conflict with the plurality of listening windows for receiving periodic beacons from BPD nodes 320A and 320C. BPD nodes 320A and 320C listen for periodic beacons from BPD node 320B during a plurality of listening windows corresponding to the plurality of transmission windows for BPD node 320B. Although not shown in FIG. 4, BPD nodes 320A and 320C can each compute message success rates associated with BPD node 320B based on the periodic beacons 434.

In some embodiments, a node includes one or more transmitted packet success rates when transmitting a periodic beacon. For example, the node could include the one or more transmitted packet success rates as header information in a periodic beacon transmission. As discussed in further detail below, the node could also include other success rate information, such as an accumulated uplink message success rate and/or an accumulated downlink message success rate. Each transmitted packet success rate is associated with a neighboring node and indicates a ratio between a number of periodic beacons transmitted by the neighboring node that were received by the node and a number of periodic beacons transmitted by the neighboring node. In some embodiments, the node includes a transmitted packet success rate for each neighboring node that is a child node of the node.

As shown in FIG. 4A, BPD node 320A includes packet success rates 440 in periodic beacon 430. The packet success rates 440 could include a transmitted packet success rate for each neighboring node of BPD node 320A, e.g., BPD node 320B and BPD node 320D. BPD node 320A determines the transmitted packet success rate for BPD node 320B based on the number of periodic beacons 434 transmitted by BPD node 320B and the number of periodic beacons 434 received by BPD node 320A. Similarly, BPD node 320C includes packet success rates 442 in periodic beacon 432. The packet success rates 442 could include a transmitted packet success rate for BPD node 320B. BPD node 320C determines the transmitted packet success rate for BPD node 320B based on the number of periodic beacons 434 transmitted by BPD node 320B and the number of periodic beacons 434 received by BPD node 320C.

Additionally, BPD node 320B includes packet success rates 444 in periodic beacon 434. Packet success rates 444 could include a transmitted packet success rate corresponding to BPD node 320A and a transmitted packet success rate corresponding to BPD node 320C. The transmitted packet success rate corresponding to BPD node 320A is determined based on the number of periodic beacons 430 transmitted from BPD node 320A to BPD node 320B and the number of periodic beacons 430 received by BPD node 320B. The transmitted packet success rate corresponding to BPD node 320C is determined based on the number of periodic beacons 432 transmitted from BPD node 320C to BPD node 320B and the number of periodic beacons 432 received by BPD node 320B.

In some embodiments, a node computes a transmitted packet success rate for a neighboring node based on the number of beacon receive attempts 420 and number of beacons received 422 for the neighboring node. Accordingly, the transmitted packet success rate transmitted to the neighboring node is the same as the received packet success rate computed for the neighboring node. The transmitted packet success rate can be computed in a manner similar that discussed above for computing a received packet success rate for a neighboring node, e.g., using equation (1). In some embodiments, the node includes the received packet success rates computed for its neighboring nodes as the transmitted packet success rates for the neighboring nodes when transmitting a periodic beacon. For example, BPD node 320B includes the received packet success rates computed for BPD nodes 320A and 320C as the transmitted packet success rates for BPD nodes 320A and 320C, respectively.

In some embodiments, a node computes a transmitted packet success rate based on the average received packet success rate calculated for the neighboring node. For example, the transmitted packet success rate could be calculated by averaging the values stored in the array of received packet success rates corresponding to the neighboring node.

In some embodiments, a node computes a transmitted packet success rate based on an average received packet success rate and a standard deviation of a plurality of transmitted packet success rates corresponding to the neighboring node. In such cases, the transmitted packet success rate can be computed in a manner similar to that discussed above for computing PBPSRUse based on the average received packet success rate and the standard deviation of the different packet success rates, e.g., using equation (3).

In some embodiments, a node computes a transmitted packet success rate based on the lowest received packet success rate for the neighboring node. For example, the transmitted packet success rate could be calculated by finding the lowest value stored in the array of received packet success rate values.

In some embodiments, when a node receives a periodic beacon from a neighboring node, the node determines whether the periodic beacon includes a transmitted packet success rate associated with the node transmitting periodic beacons to the neighboring node. For example, packet success rates 440 could include a transmitted packet success rate for each neighboring node of BPD node 320A. Additionally, the periodic beacon could include identifier information for each neighboring node, such as a MAC address, with the corresponding transmitted packet success rate. BPD node 320B receives periodic beacon 430 and determines, based on the identifier information, a transmitted packet success rate included in packet success rates 440 that corresponds to the BPD node 320B sending periodic beacons 434 to BPD node 320A. In some embodiments, the node stores the transmitted packet success rate received from the neighboring node in an entry in NHT 250 corresponding to the neighboring node. For example, BPD node 320B stores the transmitted packet success rate included in periodic beacon 430 in an entry in NHT 250 corresponding to BPD node 320A.

In some embodiments, BPD node 320B computes, for each neighboring node (e.g., BPD node 320A and BPD node 320C), a local received message success rate 424 associated with the direct connection to the neighboring node (e.g., communication link 330B and communication link 330D, respectively). In some embodiments, BPD node 320B computes a local received message success rate 424 for a neighboring node each time BPD node 320B attempts to receive a periodic beacon from the neighboring node. In some embodiments, BPD node 320B computes a local received message success rate 424 for a neighboring node after the number of beacon receive attempts 420 for the node reaches a threshold amount. In some embodiments, BPD node 320B computes a local received message success rate 424 for a neighboring node after BPD node 320B has been listening for periodic beacons for a threshold amount of time, such as after an evaluation period. In some embodiments, after computing the local received message success rate 424 for a neighboring node, BPD node 320B resets the values of the number of beacon receive attempts 420 and number of beacons received 422 for the neighboring node to zero and repeats the evaluation process. In some embodiments, BPD node 320B repeats computing local message success rates throughout an evaluation period. In some embodiments, BPD node 320B repeats computing local message success rates on a periodic basis, e.g., hourly, daily, or weekly.

In some embodiments, BPD node 320B computes a local received message success rate 424 corresponding to a neighboring node based on the received packet success rate computed for the neighboring node. As discussed above, if the neighboring node is a parent node, in this case BPD node 320A, then the local received message success rate 424 is a local downlink message success rate. An example function for computing a local received message success rate (or local downlink message success rate) based on a received packet success rate is given by equation (2):

$$DLMSR = 1 - \left(1 - \left(PBSizeAdj \times \frac{PBPSRU_{se}}{250}\right)\right)^{DLMSRAttempts} \quad (2)$$

In equation (2), PBSizeAdj represents a pre-defined value for adjusting the packet success rate based on an average packet size of periodic beacons relative to an average packet size of data message frames. Because the packet size of the typical periodic beacon is different from the packet size of a typical data frame, the message success rate is adjusted to compensate for the differences in packet sizes. PBSizeAdj could be derived, for example, based on packet success rates for a given bit error rate for different packet sizes. DLMSRAttempts represents a pre-defined value representing a number of retry attempts used when transmitting typical data messages.

In some embodiments, computing the received message success rate is based on an average received packet success rate. In such cases, PBPSRUse represents the average of the different received packet success rates computed for the different neighboring node. For example, PBPSRUse could be calculated by averaging the values stored in the array of received packet success rates.

In some embodiments, computing the received message success rate is based on the average received packet success rate and the standard deviation of the different received packet success rates computed for the neighboring node. In such cases, PBPSRUse represents the difference between the average received packet success rate and the standard deviation. An example function for computing PBPSRUse based on an average received packet success rate and a standard deviation of different received packet success rates is given by equation (3):

$$PBPSRUse = PSR\_Avg - (PBStdDevMult \times PSR\_StdDev) \quad (3)$$

In equation (3), PSR_Avg represents the average received packet success rate for a plurality of local link packet success rates for the neighboring node, PSR_StdDev represents the standard deviation of the plurality of local link packet success rates, and PBStdDevMult represents a configuration parameter allowing the PSR_StdDev to be modified. The PBStdDevMult may be a pre-determined value for scaling the standard deviation based on the average packet size of periodic beacons relative to the average packet size of data message frames.

In some embodiments, computing the local received message success rate is based on the received packet success rate with the lowest value. In such cases, PBPSRUse represents the lowest received packet success rate of the different received packet success rates computed for the neighboring node. For example, PBPSRUse could be calculated by finding the lowest value stored in the array of received packet success rate values.

In some embodiments, the local received message success rate is scaled into a different resolution. Additionally, the local received message success rate can be offset by a message success rate offset value. For example, the local received message success rate could correspond to a percentage between 0% and 100%. The local received message success rate could be scaled, and the offset value applied, such that percentages lower than 75% are equal to 0, and percentages between 75.1% and 100% are converted to an integer value between 1 and 250 (e.g., 75.1% is equal to 1, 90% is equal to 150, 100% is equal to 250, and so forth).

In some embodiments, BPD node 320B computes a local transmitted message success rate 426 corresponding to a neighbor node based on the transmitted packet success rate received from the neighboring node. As discussed above, if the neighboring node is a parent node, in this case BPD node 320A, then the local transmitted message success rate 426 is a local uplink message success rate. An example function for computing a local transmitted message success rate (or local uplink message success rate) based on a transmitted packet success rate is given by equation (4):

$$ULMSR = 1 - \left(1 - \left(PBSizeAdj \times \frac{ULPSR}{250}\right)\right)^{ULMSRAttempts} \quad (4)$$

In equation (4), PBSizeAdj represents a pre-defined value for adjusting the packet success rate based on an average packet size of periodic beacons relative to an average packet size of data message frames. Because the packet size of the typical periodic beacon is different from the packet size of a typical data frame, the message success rate is adjusted to compensate for the differences in packet sizes. ULPSR represents the transmitted packet success rate received from the neighboring node. ULMSRAttempts represents a pre-defined value representing a number of retry attempts used when transmitting typical data messages.

In some embodiments, the transmitted message success rate is scaled into a different resolution. Additionally, the transmitted message success rate can be offset by a message success rate offset value. For example, the transmitted message success rate could correspond to a percentage between 0% and 100%. The transmitted message success rate could be scaled, and the offset value applied, such that percentages lower than 75% are equal to 0, and percentages between 75.1% and 100% are converted to an integer value between 1 and 250 (e.g., 75.1% is equal to 1, 90% is equal to 150, 100% is equal to 250, and so forth).

Figure 4B:
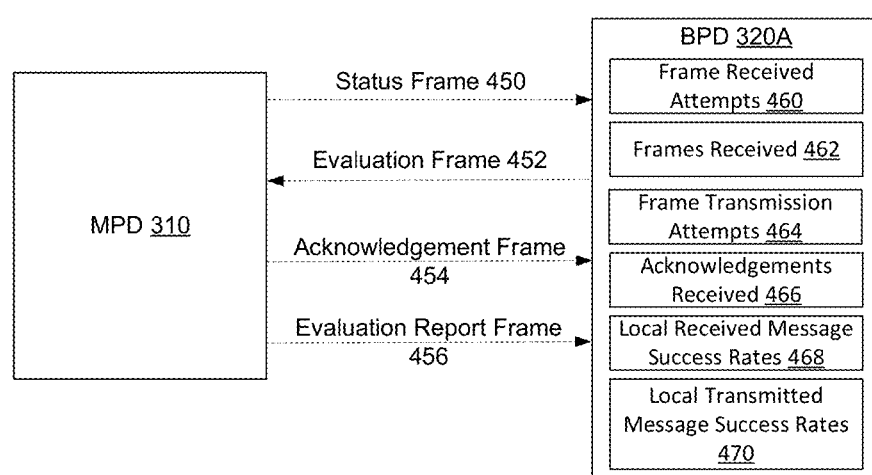
FIG. 4B illustrates data flows for computing local message success rates for nodes of the node subtree of FIG. 3, according to various embodiments.

FIG. 4B is a block diagram illustrating data flows for determining message success rates associated with a direct connection between a BPD node and a MPD node, according to one embodiment of the present invention.

As shown in FIG. 4B, BPD node 320A listens for data frame messages from MPD node 310, such as status frames 450. Referring to FIG. 3, BPD node 320A listens for status frame 450 via communication link 330A. In some embodiments, BPD node 320A listens for data frames during a listening window. The listening window can occur at regular intervals. In some embodiments, MPD node 310 determines a transmission schedule for transmitting data frames to BPD node 320A, based on the listening window for BPD node 320A. MPD node 310 transmits status frame 450 to BPD node 320A based on the transmission schedule.

As shown in FIG. 4B, while BPD node 320A listens for status frames, BPD node 320A tracks a number of frame receive attempts 460 and a number of frames received 462. The number of frame receive attempts 460 indicates a number of times BPD node 320A attempted to receive a status frame from MPD node 310. In some embodiments, the number of frame receive attempts 460 corresponds to the number of listening windows in which BPD node 320A listened for status frames. The number of frames received 462 indicates a number of status frames BPD node 320A successfully received while listening for status frames.

In some embodiments, BPD node 320A stores the number of frame receive attempts 460 and number of frames received 462 for MPD node 310 in a corresponding entry in a node table 248, such as NHT 250. For example, when BPD node 320A listens for status frame 450, BPD node 320A updates the entry in NHT 250 corresponding to MPD node 310 to reflect the attempt to receive the status frame 450. If BPD node 320A successfully receives the status frame 450, then BPD node 320A updates the corresponding entry in NHT 250 to reflect that the status frame 450 was received.

In some embodiments, BPD node 320A computes a local received message success rate 468 associated with communication link 330A to MPD node 310. As discussed above, because MPD node 310 is a parent node of BPD node 320A, the local received message success rate 468 for MPD node 310 is a local downlink message success rate. In some embodiments, BPD node 320A computes a local received message success rate 468 each time BPD node 320A attempts to receive a status frame 450 from MPD node 310. In some embodiments, BPD node 320A computes a local received message success rate 468 for MPD node 310 after the number of frame receive attempts 460 reaches a threshold amount. In some embodiments, BPD node 320A computes a local received message success rate 468 for MPD node 310 after BPD node 320A has been listening for status frames for a threshold amount of time, such as after an evaluation period. In some embodiments, after computing the local received message success rate 468 for MPD node 310, BPD node 320A resets the values of the number of frame receive attempts 460 and number of frames received 462 for MPD node 310 to zero and repeats the evaluation process. In some embodiments, BPD node 320A repeats computing local received message success rates throughout an evaluation period. In some embodiments, BPD node 320A repeats computing local received message success rates on a periodic basis, e.g., hourly, daily, or weekly.

In some embodiments, to compute a local received message success rate 468 for MPD node 310, BPD node 320A computes a received packet success rate based on the number of frame receive attempts 460 and the number of frames received 462. An example function for computing the received packet success rate, BLSRecPSR, is given by equation (5):

$$BLSRecPSR = \left(\frac{BLSRecSuccess}{BLSRecAttempts}\right) \times 250 \quad (5)$$

In equation (5), BLSRecSuccess corresponds to the value of frames received 462 for MPD 310 and BLSRecAttempts corresponds to the value of frame receive attempts 460. Accordingly, in equation (5), the received packet success rate represents a ratio between the number of frames received 462 and the number of frame receive attempts 460. In some embodiments, the received packet success rate is rounded to the nearest integer value.

In some embodiments, BPD node 320A stores the received packet success rate in an entry in NHT 250 corresponding to MPD node 310. In some embodiments, NHT 250 stores an array of received packet success rates comprising different received success rates computed for MPD node 310 at different times. In some embodiments, the array of received packet success rates is associated with a threshold size. If the number of received packet success rates reaches the threshold size, then storing the received packet success rate includes removing the oldest received packet success rate from the array.

BPD node 320A computes a received message success rate 468 based on the received packet success rate. An example function for computing a received message success rate based on a received packet success rate is given by equation (6):

$$DLMSR = 1 - \left(1 - \left(BLSSizeAdj \times \frac{BLSPSRU_{se}}{250}\right)\right)^{BLSRxAttempts} \quad (6)$$

In equation (6), BLSSizeAdj represents a pre-defined value for adjusting the packet success rate based on an average packet size of status frames relative to an average packet size of data message frames. Because the packet size of the status frame is different from the packet size of a typical data frame, the received message success rate is adjusted to compensate for the differences in packet sizes. BLSRxAttempts represents a pre-defined value representing a number of attempts typically used to obtain a successful message exchange.

In some embodiments, computing the local received message success rate is based on an average received packet success rate. In such cases, BLSPSRUse represents the average of the different received packet success rates computed for MPD node 310. For example, BLSPSRUse could be calculated by averaging the values stored in the array of received packet success rates.

In some embodiments, computing the local received message success rate is based on the average received packet success rate and the standard deviation of the different received packet success rates. In such cases, BLSPSRUse represents the difference between the average received packet success rate and the standard deviation. An example function for computing BLSPSRUse based on an average received packet success rate and a standard deviation of different received packet success rates is given by equation (7):

$$BLSPSRUse = PSR\_Avg - (BLSStdDevMult \times PSR\_StdDev) \quad (7)$$

In equation (7), PSR_Avg represents the average received packet success rate for a plurality of received packet success rates for MPD node 310, PSR_StdDev represents the standard deviation of the plurality of received packet success rates, and BLSStdDevMult represents a pre-determined value for scaling the standard deviation based on the average packet size of status frames relative to the average packet size of data message frames.

In some embodiments, computing the local received message success rate is based on the received packet success rate with the lowest value. In such cases, BLSPSRUse represents the lowest received packet success rate of the different received packet success rates computed for MPD node 310. For example, BLSPSRUse could be calculated by finding the lowest value stored in the array of received packet success rate values.

In some embodiments, the local received message success rate is scaled into a different resolution. Additionally, the local received message success rate can be offset by a message success rate offset value. For example, the local received message success rate could correspond to a percentage between 0% and 100%. The local received message success rate could be scaled, and the offset value applied, such that percentages lower than 75% are equal to 0, and percentages between 75.1% and 100% are converted to an integer value between 1 and 250 (e.g., 75.1% is equal to 1, 90% is equal to 150, 100% is equal to 250, and so forth).

As shown in FIG. 4B, BPD node 320A transmits a plurality of evaluation frames 452 to MPD node 310. When MPD node 310 receives an evaluation frame 452, MPD node 310 transmits an acknowledgement frame 454 in return. After transmitting an evaluation frame 452, BPD node 320A listens for a corresponding acknowledgement frame 454. In some embodiments, each evaluation frame 452 includes a frame sequence number corresponding to the evaluation frame 452. The acknowledgement frame 454 transmitted in response to the evaluation frame 452 includes the frame sequence number corresponding to the evaluation frame 452. BPD node 320A can use the frame sequence number to track whether a corresponding acknowledgement frame 454 was received for each evaluation frame 452.

As shown in FIG. 4B, while BPD node 320A sends evaluation frames, BPD node 320A tracks a number of frame transmission attempts 464 and a number of acknowledgements received 466. The number of frame transmission attempts 464 indicates a number of times BPD node 320A attempted to transmit an evaluation frame to MPD node 310.

The number of acknowledgements received 466 indicates a number of acknowledgement frames BPD node 320A successfully received after sending an evaluation frame.

In some embodiments, BPD node 320A stores the number of frame transmission attempts 464 and number of acknowledgements received 466 in an entry corresponding to MPD node 310 in a node table 248, such as NHT 250. For example, when BPD node 320A transmits evaluation frame 452, BPD node 320A updates the entry in NHT 250 corresponding to MPD node 310 to reflect the attempt to transmit the evaluation frame 452. If BPD node 320A successfully receives a corresponding acknowledgement frame 454, then BPD node 320A updates the corresponding entry in NHT 250 to reflect that the acknowledgement frame 454 was received.

In some embodiments, BPD node 320A computes a local transmitted message success rate 470 for MPD node 310 based on acknowledgement frames 454 received from MPD node 310. As discussed above, because MPD node 310 is a parent node of BPD node 320A, the local transmitted message success rate 470 for MPD node 310 is a local uplink message success rate. An example function for computing a transmitted message success rate based on acknowledgement frames is given by equation (8):

$$ULMSR = 1 - \left(1 - \left(LESizeAdj \times \frac{LEAcksRcvd}{LETxCount}\right)\right)^{LETxAttempts} \quad (8)$$

In equation (8), LESizeAdj represents a pre-defined value for adjusting the packet success rate based on an average packet size of evaluation frames relative to an average packet size of data message frames. Because the packet size of the typical evaluation frame is different from the packet size of a typical data frame, the message success rate is adjusted to compensate for the differences in packet sizes. LEAcksRcvd represents the number of acknowledgement frames received from MPD node 310 during the acknowledged evaluation frame period or, as described below, the number of received evaluation frames received as reported in the Link Evaluation Report frame sent from MPD node 310 to BPD node 320A. LETxCount represents the number of evaluation frames transmitted to MPD node 310. LETxAttempts represents a pre-defined value representing a number of attempts typically used to obtain a successful uplink data message exchange.

In some embodiments, the local transmitted message success rate 470 is scaled into a different resolution. Additionally, the local transmitted message success rate 470 can be offset by a message success rate offset value. For example, the local transmitted message success rate could correspond to a percentage between 0% and 100%. The uplink message success rate could be scaled, and the offset value applied, such that percentages lower than 75% are equal to 0, and percentages between 75.1% and 100% are converted to an integer value between 1 and 250 (e.g., 75.1% is equal to 1, 90% is equal to 150, 100% is equal to 250, and so forth).

In some embodiments, BPD node 320A transmits the plurality of evaluation frames 452 and receives acknowledgement frames 454 during an acknowledged evaluation period. The acknowledged evaluation period could be, for example, while BPD node 320A evaluates MPD node 310 as a potential parent node.

In some embodiments, after the acknowledged evaluation period, BPD node 320A transmits a second plurality of evaluation frames 452 to MPD node 310 during an unacknowledged evaluation period. For example, after BPD node 320A selects MPD node 310 as a parent node, then BPD node 320A transmits evaluation frames 452 that do not require an acknowledgement. In some embodiments, BPD node 320A transmits a pre-defined number of evaluation frames 452 across an evaluation period and/or for a pre-defined length of time, e.g., daily. In some embodiments, each evaluation frame 452 indicate an evaluation period sequence number corresponding to the evaluation period in which the evaluation frame 452 is being transmitted. At the end of the evaluation period, BPD node 320A starts a new evaluation period by incrementing or otherwise changing the evaluation period sequence number included in the evaluation frames 452.

When MPD node 310 receives an evaluation frame 452 and no acknowledgement is requested, MPD node 310 increments a count (not shown) of evaluation frames that have been received. The MPD node 310 receives an evaluation frame 452 and determines, based on the evaluation period sequence number included in the evaluation frame 452, the current unacknowledged evaluation period. If the MPD node 310 determines that the unacknowledged evaluation period has changed (e.g., the evaluation period sequence number has changed), then the MPD node 310 sends a link evaluation report frame 456 to the BPD node 320A. The evaluation report frame 456 includes a number of evaluation frames 452 that MPD node 310 received during the prior unacknowledged evaluation period. The MPD node 310 also restarts the count of received frames at 1 for the new evaluation period initiated by the BPD node 320A (via changing the evaluation period sequence number). BPD node 320A receives the evaluation report frame 456, including the number of evaluation frames received by MPD node 310. In some embodiments, BPD node 320A stores the number of frames received by MPD node 310 in an entry corresponding to MPD node 310 in a node table 248, such as NHT 250.

In some embodiments, BPD node 320A computes a local transmitted message success rate 470 for MPD node 310 based on the evaluation report frame 456 received from MPD node 310. As discussed above, because MPD node 310 is a parent node of BPD node 320A, the local transmitted message success rate 470 for MPD node 310 is a local uplink message success rate. Computing the local transmitted message success rate based on the evaluation report frame is performed in a manner similar to that described above with reference to equation (8). Rather than using the number of acknowledgement frames received, BPD node 320A computes the local transmitted message success rate based on the number of frames received by MPD node 310 that is indicated in the evaluation report frame 456 and the number of evaluation frames 452 transmitted during the corresponding evaluation period.

Figure 5:
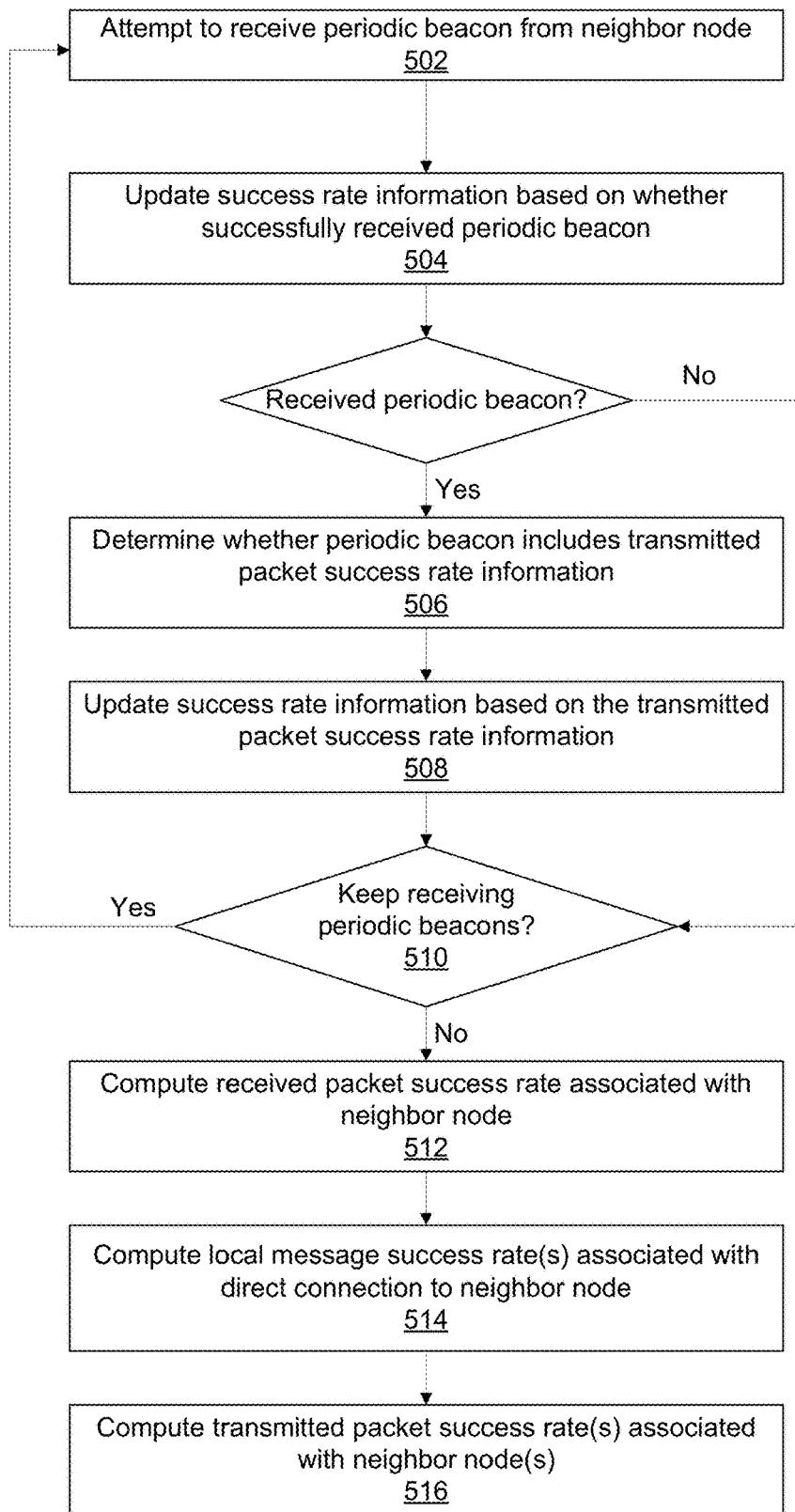
FIG. 5 is a flow diagram of method steps for determining local message success rates, according to various embodiments.

FIG. 5 is a flow diagram of method steps for determining local message success rates with respect to a node within a network, according to various embodiments. Although the method steps are described in conjunction with the systems of FIGS. 1-2, persons skilled in the art will understand that any system configured to perform the method steps in any order falls within the scope of the present disclosure.

As shown in FIG. 5, a method 500 begins at step 502, where a node attempts to receive a periodic beacon from a neighbor node. For example, BPD node 320B attempts to receive a periodic beacon 430 from BPD node 320A. In some embodiments, the node determines a listening window corresponding to the neighbor node and listens for the periodic beacon during the listening window.

In step 504, the node updates success rate information associated with the neighbor node based on whether the node successfully received the periodic beacon. In some embodiments, updating the success rate information includes updating a number of beacon receive attempts associated with the neighbor node. In some embodiments, if the node successfully received the periodic beacon, updating the success rate information includes updating a number of received beacons associated with the neighbor node. For example, BPD node 320B increments beacon receive attempts 420 based on the attempt to receive the periodic beacon 430 from BPD node 320A. If BPD node 320B received periodic beacon 430, then BPD node 320B increments beacons received 422 based on successfully receiving the periodic beacon 430.

In some embodiments, updating the success rate information includes updating an entry corresponding to the neighbor node in one or more node tables. For example, if the method 500 is performed as part of a parent discovery process, the node could update a potential parent table that stores information associated with potential parent nodes. The potential parent table includes success rate information for each potential parent node. As another example, if the method 500 is performed as part of an established link evaluation process, the node could update a neighborhood table that stores information associated with neighbor nodes. The neighborhood table includes success rate information for established neighbor nodes.

If the periodic beacon was successfully received, then in step 506, the node determines whether the periodic beacon includes a transmitted packet success rate from the neighbor node. In some embodiments, the neighbor node includes one or more transmitted packet success rates in the periodic beacon. Each transmitted packet success rate is associated with a different neighbor node, e.g., parent node or child nodes, of the neighbor node. The node determines whether a transmitted packet success rate included in the one or more transmitted packet success rates of the received periodic beacon is associated with itself.

If the periodic beacon included a transmitted packet success rate from the neighbor node, then in step 508, the node updates success rate information for the neighbor node based on the transmitted packet success rate. In some embodiments, updating the success rate information includes updating an entry corresponding to the neighbor node in one or more node tables.

In step 510, the node determines whether to listen for additional periodic beacons from the neighbor node. If the node determines that the node should continue to listen for periodic beacons, then the method 500 returns to step 502, where the node attempts to receive another periodic beacon from the neighbor node. If the node determines that the node has completed listening for periodic beacons, then the method proceeds to step 512.

In some embodiments, the node listens for periodic beacons until the number of beacon receive attempts 420 reaches a threshold value. If the number of beacon receive attempts 420 has not reached the threshold value, then the node determines that the node should listen for additional periodic beacons. In some embodiments, the node listens for periodic beacons for a threshold amount of time. If the amount of time in which the node listened for periodic beacons has not reached the threshold amount of time, then the node determines that the node should listen for additional periodic beacons.

In step 512, the node computes a received packet success rate associated with the neighbor node. Computing a received packet success rate is performed in a manner similar to that discussed above with respect to BPD node 320B. In some embodiments, the node computes the received packet success rate based on a number of beacon receive attempts associated with the neighbor node and a number of beacons received for the neighbor node. For example, BPD node 320B computes a received packet success rate based on beacon receive attempts 420 and received beacons 422 corresponding to BPD node 320A.

In some embodiments, the node stores the received packet success rate in an entry corresponding to the neighbor node in a node table, such as neighborhood table 250. In some embodiments, the node stores an array of received packet success rates comprising different received packet success rates computed for the neighboring node at different times. The node computes the received packet success rate and adds the received packet success rate to the array.

In step 514, the node computes one or more local message success rates associated with the direct connection with the neighbor node based on success rate information associated with the neighbor node. The success rate information includes, for example, the transmitted packet success rate and/or the received packet success rate. In some embodiments, computing the one or more local message success rates includes computing a local transmitted message success rate and/or a local received message success rate. Computing the local transmitted message success rate and the local received message success rate is performed in a manner similar to that discussed above with respect to BPD node 320B. In some embodiments, computing the local transmitted message success rate and/or the local received message success rate includes adjusting the local transmitted message success rate and/or the local received message success rate to account for the size difference between periodic beacons and typical data frames. In some embodiments, computing the local transmitted message success rate and/or the local received message success rate includes adjusting the local transmitted message success rate and/or the local received message success rate to account for the number of retries that are used when transmitting typical data messages.

In some embodiments, after computing the local transmitted message success rate, the node stores the local transmitted message success rate in an entry corresponding to the neighbor node in a node table, such as neighborhood table 250. In some embodiments, after computing the local received message success rate, the node stores the local received message success rate in an entry corresponding to the neighbor node in a node table, such as neighborhood table 250.

Optionally, in step 516, the node computes one or more transmitted packet success rates, where each transmitted packet success rate corresponds to a different neighbor node of the node. Computing the one or more transmitted packet success rates is performed in a manner similar to that discussed above with respect to BPD node 320B. In some embodiments, the node includes the one or more transmitted packet success rates in periodic beacon transmissions to its neighbor nodes.

In some embodiments, the node resets the values of the number of beacon receive attempts 420 and the number of beacons receive 422, and repeats the method 500 (e.g., steps 502-616). In some embodiments, the node repeats the method 500 throughout an evaluation period. In some embodiments, the node repeats the method 500 periodically, e.g., hourly, daily, weekly, and so forth.

Figure 6:
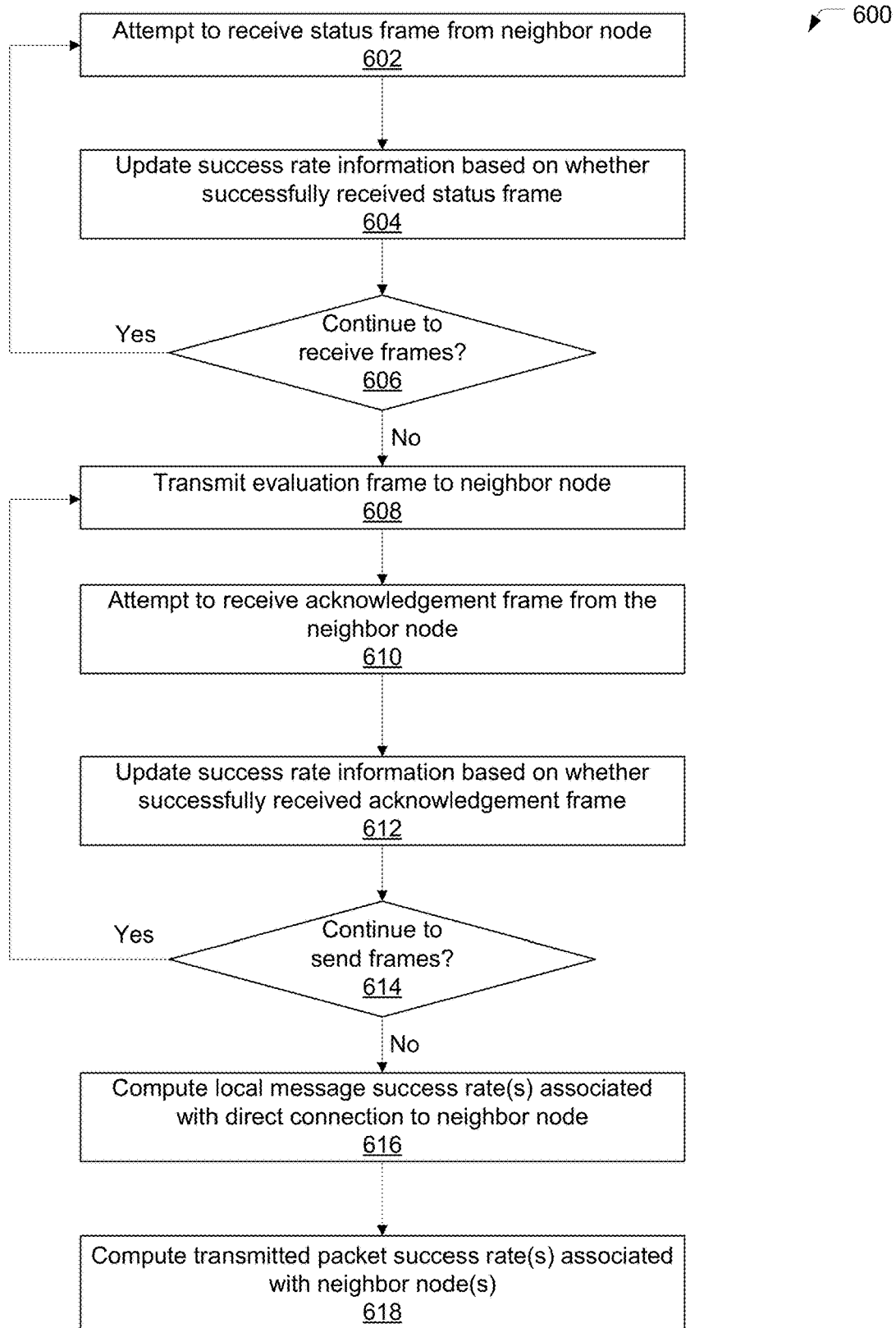
FIG. 6 is a flow diagram of method steps for determining local message success rates, according to various embodiments.

FIG. 6 is a flow diagram of method steps for determining local message success rates with respect to a node within a network, according to various embodiments. Although the method steps are described in conjunction with the systems of FIGS. 1-2, persons skilled in the art will understand that any system configured to perform the method steps in any order falls within the scope of the present disclosure.

As shown in FIG. 6, a method 600 begins at step 602, where a node attempts to receive a status frame from a neighbor node. For example, BPD node 320A attempts to receive a status frame 450 from MPD node 310. In some embodiments, the node determines a listening schedule for listening for status frames, and the neighbor node attempts to transmit the status frame based on the listening schedule.

In step 604, the node updates success rate information associated with the neighbor node based on whether the node successfully received the status frame. In some embodiments, updating the success rate information includes updating a number of frame receive attempts associated with the neighbor node. In some embodiments, if the node successfully received the status frame, updating the success rate information includes updating a number of received frames associated with the neighbor node. For example, BPD node 320A increments frame receive attempts 460 based on the attempt to receive status frame 450 from MPD node 310. If BPD node 320A received status frame 450, then BPD node 320A increments frames received 462 based on successfully receiving the status frame 450.

In some embodiments, updating the success rate information includes updating an entry corresponding to the neighbor node in one or more node tables. For example, if the method 600 is performed as part of a parent discovery process, the node could update a potential parent table that stores information associated with potential parent nodes. The potential parent table includes success rate information for each potential parent node. As another example, if the method 600 is performed as part of an established link evaluation process, the node could update a neighborhood table that stores information associated with neighbor nodes. The neighborhood table includes success rate information for established neighbor nodes.

In step 606, the node determines whether to continue to attempt to receive status frames from the neighbor node. If the node determines that the node should continue to listen for status frames, then the method 600 returns to step 602, where the node attempts to receive another status frame from the neighbor node. If the node determines that the node has completed listening for status frames, then the method proceeds to step 608. In some embodiments, rather than performing the steps 608-614 below after step 606, the steps 608-614 are performed in parallel while performing the steps 602-606.

In step 608, the node transmits an evaluation frame to the neighbor node. For example, BPD node 320A transmits evaluation frame 452 to MPD node 310. In some embodiments, the node determines a transmission window for transmitting the evaluation frame. BPD node 320A determines a transmission window for transmitting evaluation frame 452 that does not conflict with listening times included in the listening schedule for status frames. If the neighbor node successfully receives the evaluation frame, then the neighbor node transmits an acknowledgement frame to the node. For example, MPD node 310 transmits acknowledgement frame 454 after receiving evaluation frame 452 from BPD node 320A.

In step 610, the node attempts to receive an acknowledgement frame from the neighbor node. In some embodiments, the acknowledgement is sent at after a specific period after the evaluation frame reception.

In step 612, the node updates success rate information associated with the neighbor node based on whether the node successfully received the acknowledgement frame. In some embodiments, updating the success rate information includes updating a number of evaluation frame transmission attempts associated with the neighbor node. In some embodiments, if the node successfully received the acknowledgement frame, updating the success rate information includes updating a number of received acknowledgement frames associated with the neighbor node. For example, BPD node 320A increments evaluation frame transmission attempts 464 based on the attempt to transmit the evaluation frame 452 to MPD node 310. If BPD node 320A received an acknowledgement frame 454 in response, then BPD node 320A increments acknowledgements received 466 based on successfully transmitting the evaluation frame 452 and receiving the acknowledgement frame 454. In some embodiments, updating the success rate information includes updating an entry corresponding to the neighbor node in one or more node tables.

In step 614, the node determines whether to transmit additional evaluation frames to the neighbor node. If the node determines that the node should continue to transmit evaluation frames, then the method 600 returns to step 608, where the node attempts to transmit another evaluation frame to the neighbor node. If the node determines that the node has completed transmitting evaluation frames, then the method proceeds to step 616.

In some embodiments, the node transmits evaluation frames until the number of frame transmission attempts 464 reaches a threshold value. If the number of frame transmission attempts 464 has not reached the threshold value, then the node determines that the node should continue to transmit evaluation frames. In some embodiments, the node transmits evaluation frames for a threshold amount of time, e.g., during a discovery period. If the amount of time in which the node has been transmitting evaluation frames has not reached the threshold amount of time, then the node determines that the node should transmit additional evaluation frames.

In some embodiments, the node transmits evaluation frames to the neighbor node that do not require an acknowledgement frame. For example, the node could transmit evaluation frames that require acknowledgement frames when selecting a parent node and transmit evaluation frames that do not require acknowledgement frames after a connection to a selected parent node has been established. In such instances, the node does not perform step 610, and performing step 612 could be limited to updating the number of evaluation frames transmitted to the neighbor node.

In some embodiments, each evaluation frame is associated with the same evaluation period sequence number. At step 614, the node continues to send evaluation frames until the end of the evaluation period. At the end of the evaluation period, the node could start a new evaluation period using a different evaluation period sequence number. When the new evaluation period is started, the neighbor node transmits an evaluation report frame that indicates a number of evaluation frames received during the evaluation period. Accordingly, rather than attempting to receive acknowledgement frames, the node attempts to receive the evaluation report frame.

In some embodiments, the node updates success rate information associated with the neighbor node based on the evaluation report frame. In some embodiments, updating the success rate information includes updating a number of evaluation frames received by the neighbor node, as indicated by the evaluation report frame. In some embodiments, updating the success rate information includes calculating a transmitted packet success rate based on the number of evaluation frames transmitted to the neighbor node and the number of evaluation frames received by the neighbor node.

As shown in FIG. 6, steps 602-606 are performed prior to steps 608-614. However, in various embodiments, steps 608-614 may be performed prior to steps 602-606 and/or performed in parallel with steps 602-606. For example, the node could transmit evaluation frames to the neighbor node while attempting to receive status frames and acknowledgement frames from the neighbor node. The neighbor node receives evaluation frames while transmitting status frames and acknowledgement frames to the node. As another example, during an unacknowledged evaluation period, the node could transmit evaluation frames while the neighbor node could transmit status frames. At the end of each unacknowledged evaluation period, the neighbor node transmits an evaluation report frame to the node.

In step 616, the node computes one or more local message success rates associated with the direct connection with the neighbor node based on success rate information associated with the neighbor node. The success rate information includes, for example, the number of frame receive attempts, the number of frames received, the number of frame transmission attempts, and the number of acknowledgements received. In some embodiments, computing the one or more local message success rates includes computing a local transmitted message success rate and/or a local received message success rate. Computing the local transmitted message success rate and the local received message success rate is performed in a manner similar to that discussed above with respect to BPD node 320A. In some embodiments, computing the local received message success rate includes adjusting the local received message success rate to account for the size difference between status frames and typical data frames. In some embodiments, computing the local transmitted message success rate includes adjusting the local transmitted message success rate to account for the size difference between evaluation frames and typical data frames. In some embodiments, computing the local received message success rate and/or the local transmitted message success rate includes adjusting the local received message success rate and/or the local transmitted message success rate to account for the number of retries that are used to obtain a successful data message exchange.

In some embodiments, the success rate information includes a number of evaluation frames received by the neighbor node during an unacknowledged evaluation period. The node receives an evaluation report frame from the neighbor that includes the number of evaluation frames received by the neighbor node. The node computes a local transmitted message success rate based on the number of evaluation frames transmitted to the neighbor node during the unacknowledged evaluation period and the number of evaluation frames received by the neighbor node during the unacknowledged evaluation period.

In some embodiments, the success rate information includes a received packet success rate associated with the neighbor node, and computing the local received message success rate is based on the received packet success rate. The node computes the received packet success rate associated with the neighbor node. Computing a received packet success rate is performed in a manner similar to that discussed above with respect to BPD node 320A. In some embodiments, the node computes the received packet success rate based on a number of frame receive attempts associated with the neighbor node and a number of status frames received for the neighbor node. For example, BPD node 320A computes a received packet success rate based on frame receive attempts 460 and received frames 462 corresponding to MPD node 310. In some embodiments, the node stores the received packet success rate in an entry corresponding to the neighbor node in a node table, such as neighborhood table 250. In some embodiments, the node stores an array of received packet success rates comprising different received packet success rates computed for the neighboring node at different times. The node computes the received packet success rate and adds the received packet success rate to the array.

Optionally, in step 618, the node computes one or more transmitted packet success rates, where each transmitted packet success rate corresponds to a different neighbor node of the node. Computing the one or more transmitted packet success rates is performed in a manner similar to that discussed above with respect to BPD nodes 320A and 320B. In some embodiments, the node includes the one or more transmitted packet success rates in periodic beacon transmissions to its neighbor nodes. For example, BPD node 320A computes a transmitted packet success rate corresponding to BPD node 320B, and includes the transmitted packet success rate in a periodic beacon transmission to BPD node 320B.

As discussed above, typical approaches for evaluating a direct connection only account for downlink reliability, i.e., whether the node is reliably receiving messages transmitted by the neighboring node. In contrast, with the disclosed approach, evaluating the direct connection based on the local uplink message success rate and the local downlink message success rate accounts for both uplink reliability and downlink reliability. As an example, if the local downlink message success rate indicates a high probability that messages sent by the parent node will be successfully received by the node, but the local uplink message success rate indicates a low probability that messages sent from a node will be successfully received by the parent node, then software application 242 can determine that the direct connection between the node and the parent node is not a reliable connection.

Additionally, different communication links between nodes could use different communication protocols. However, due to the different communication protocols, the metrics used to evaluate the different communication links may be incompatible with one another, such that communication links using different communication protocols cannot be directly compared with one another. For example, different metrics may be used for different communication protocols, or the same metric produces results on different value scales for different communication protocols. In contrast, computing the local message success rates account for differences between packet sizes of the different communication protocols, which enables software application 242 to compare different direct communication links that utilize different communication protocols.

Accumulated Message Success Rates

In some embodiments, software application 242 is configured to determine one or more accumulated message success rates associated with the path between a node and a target destination, such as a root node of subtree 300. The one or more accumulated message success rates indicate a probability that messages transmitted to the target destination and/or messages transmitted from the target destination will be received successfully. The path from the node to the target destination includes at least a direct connection between the node and its parent node. Additionally, if the node is not directly connected to the target destination, then the path includes one or more intermediary connections between the parent node and the target destination. The accumulated message success rates indicate a reliability of both the direct connection and any intermediary connections.

In some embodiments, the one or more accumulated message success rates include an accumulated uplink message success rate. The accumulated uplink message success rate indicates the probability that message from the node to the target destination, via the direct connection and any intermediary connections, will be successfully received by the target destination. For example, if the target destination is MPD node 310, then the accumulated uplink message success rate for BPD node 320B indicates the likelihood that messages sent to MPD node 310 from BPD node 320B via communication links 330A and 330B will be successfully received by MPD node 310.

In some embodiments, the one or more accumulated message success rates include an accumulated downlink message success rate. The accumulated downlink message success rate indicates the probability that messages to the node from the target destination, via the direct connection and any intermediary connections, will be successfully received by the node. For example, if the target destination is MPD node 310, then the accumulated downlink message success rate for BPD node 320B indicates the likelihood that messages sent from MPD node 310 via communication links 330A and 330B will be successfully received by BPD node 320B.

As discussed in further detail below, software application 242 uses the one or more accumulated message success rates to account for the reliability of intermediary connections to the target destination when evaluating connections between the node and a parent node. For example, the local uplink message success rate could indicate a high probability that messages sent from the node will be successfully received by the parent node. However, if the intermediary connections between the parent node and the target destination are not reliable, the accumulated uplink message success rate would indicate a lower probability that messages sent from the node will be successfully received by the target destination.

Figure 7:
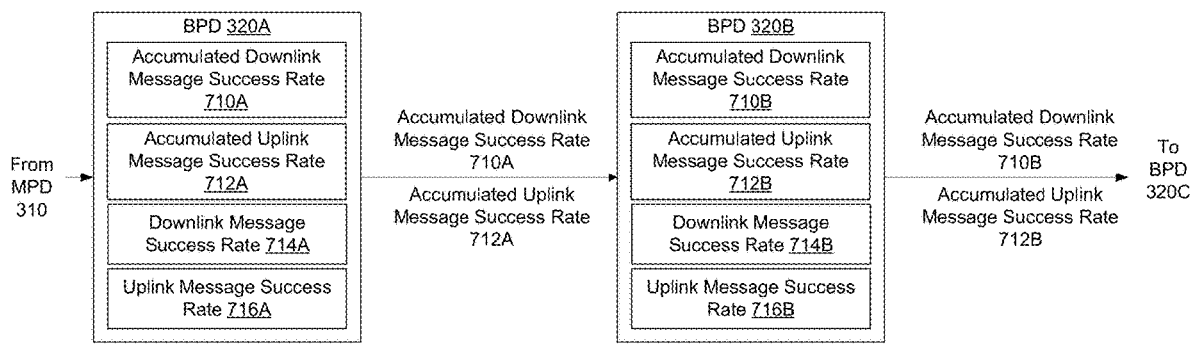
FIG. 7 illustrates data flows for computing accumulated message success rates for nodes of the node subtree of FIG. 3, according to various embodiments.

FIG. 7 is a block diagram illustrating data flows for determining accumulated message success rates, according to one embodiment of the present invention.

As shown in FIG. 7, BPD node 320A computes an accumulated downlink message success rate 710A, an accumulated uplink message success rate 712A, a downlink message success rate 714A, and an uplink message success rate 716A. Similarly, BPD node 320B computes an accumulated downlink message success rate 710B, an accumulated uplink message success rate 712B, a downlink message success rate 714B, and an uplink message success rate 716B. Computing the downlink message success rates 714A and 714B and uplink message success rates 716A and 716B is performed in a manner similar to that discussed above with respect to methods 500 and 600.

Referring to FIG. 3, BPD node 320A is directly connected to the root node of subtree 300, MPD node 310. In some embodiments, if a node is connected to the root node of the subtree, then the accumulated downlink message success rate is equal to the local downlink message success rate computed by the node and the accumulated uplink message success rate is equal to the local uplink message success rate computed by the node. For example, BPD node 320A could compute downlink message success rate 714A and set the value of accumulated downlink message success rate 710A to the value of downlink message success rate 714A. Similarly, BPD node 320A could compute uplink message success rate 716A and set the value of accumulated uplink message success rate 712A to the value of uplink message success rate 716A.

BPD node 320A transmits the accumulated downlink message success rate 710A and/or the accumulated uplink message success rate 712A to one or more neighbor nodes, such as BPD node 320B. BPD node 320B receives the accumulated downlink message success rate 710A and/or the accumulated uplink message success rate 712A.

In some embodiments, BPD node 320A includes the accumulated downlink message success rate 710A and/or the accumulated uplink message success rate 712A in one or more periodic beacon transmissions to BPD node 320B. For example, BPD node 320A could include the accumulated downlink message success rate 710A and/or the accumulated uplink message success rate 712A as header information in a periodic beacon transmission.

When BPD node 320B receives a periodic beacon from BPD node 320A, BPD node 320B determines whether the periodic beacon includes success rate information, such as the accumulated downlink message success rate 710A and/or the accumulated uplink message success rate 712A. In some embodiments, if the message includes success rate information, then BPD node 320B extracts the success rate information and stores the information in an entry of a node table 248, such as NHT 250, corresponding to BPD node 320A. In some embodiments, if the message includes success rate information, BPD node 320B determines whether the success rate information is from a parent node. If the success rate information is from a parent node, then BPD node 320B computes an accumulated downlink message success rate 710B and/or an accumulated uplink message success rate 712B based on the success rate information.

In some embodiments, BPD node 320B computes an accumulated downlink message success rate 710B based on the downlink message success rate 714B associated with the direct connection to BPD node 320A, as well as the accumulated downlink message success rate 710A received from BPD node 320A. In some embodiments, BPD node 320B stores the accumulated downlink message success rate 710B in memory 240 of the BPD node 320B, for example, in database 246. An example function for computing the accumulated downlink message success rate, ADLMSR, is given by equation (9):

$$\text{ADLMSR}=(\text{DLMSR}/1000+\text{offset})\times(\text{nhtADLMSR}/1000+\text{offset}) \quad (9)$$

In equation (9), DLMSR corresponds to the local downlink message success rate computed for the parent node (e.g., BPD node 320A), nhtADLMSR corresponds to the accumulated downlink message success rate received from the parent node (e.g., accumulated downlink message success rate 710A), and offset corresponds to a pre-defined offset value for offsetting message success rates. In some embodiments, message success rates are expressed in a specific resolution and/or offset into a specific value range. For example, message success rates lower than an offset value could be set to equal to 0, and message success rates higher than the offset value are reduced by the offset value. As another example, message success rates could be scaled from decimal percentages into integer values, e.g., multiplied by 100, 1000, or the like. Accordingly, in equation (9), DLMSR and nhtADLMSR are divided by 1000 to scale the values back to an original resolution, and offset is added back into the values. In some embodiments, the scaled and/or offset values for DLMSR and/or nhtADLMSR are used instead.

In some embodiments, BPD node 320B computes an accumulated uplink message success rate 712B based on the uplink message success rate 716B associated with the direct connection to BPD node 320A, as well as the accumulated uplink message success rate 712A received from BPD node 320A. In some embodiments, BPD node 320B stores the accumulated uplink message success rate 712B in memory 240 of the BPD node 320B, for example, in database 246. An example function for computing the accumulated uplink message success rate, AULMSR, is given by equation (10):

$$AULMSR = (ULMSR/1000 + \text{offset}) \times (nhtAULMSR/1000 + \text{offset}) \quad (10)$$

In equation (10), ULMSR corresponds to the local uplink message success rate computed for the parent node (e.g., BPD node 320A), nhtAULMSR corresponds to the accumulated uplink message success rate received from the parent node (e.g., accumulated uplink message success rate 712A), and offset corresponds to the pre-defined value for scaling message success rates. In some embodiments, message success rates are expressed in a specific resolution and/or offset into a specific value range. For example, message success rates lower than an offset value could be set to equal to 0, and message success rates higher than the offset value are reduced by the offset value. As another example, message success rates could be scaled from decimal percentages into integer values, e.g., multiplied by 100, 1000, or the like. Accordingly, in equation (10), ULMSR and nhtAULMSR is divided by 1000 to scale the values back to an original resolution, and offset is added back into the value. The scale and/or offset value used for ULMSR and/or nhtAULMSR may differ from the scale and/or offset value used for DLMSR and/or nhtADLMSR. In some embodiments, the scaled and/or offset values for ULMSR and/or nhtAULMSR are used instead.

In some embodiments, BPD node 320B includes the accumulated downlink message success rate 710B and/or the accumulated uplink message success rate 712B in one or more periodic beacon transmissions to one or more neighbor nodes, such as BPD node 320C.

In some embodiments, if message success rates are expressed in a specific resolution, then prior to storing and/or transmitting the accumulated downlink message success rate 710B and the accumulated uplink message success rate 712B, BPD node 320B scales the accumulated downlink message success rate 710B and the accumulated uplink message success rate 712B into the specific resolution. Additionally, if message success rates are offset into a specific range of values, then BPD node 320B applies the offset value to the accumulated downlink message success rate 710B and the accumulated uplink message success rate 712B. In some embodiments, if the accumulated downlink message success rate 710B and/or the accumulated uplink message success rate 712B are lower than the offset value, then BPD node 320B sets the value of the accumulated downlink message success rate 710B and/or the accumulated uplink message success rate 712B, as the case may be, equal to 0.

Figure 8:
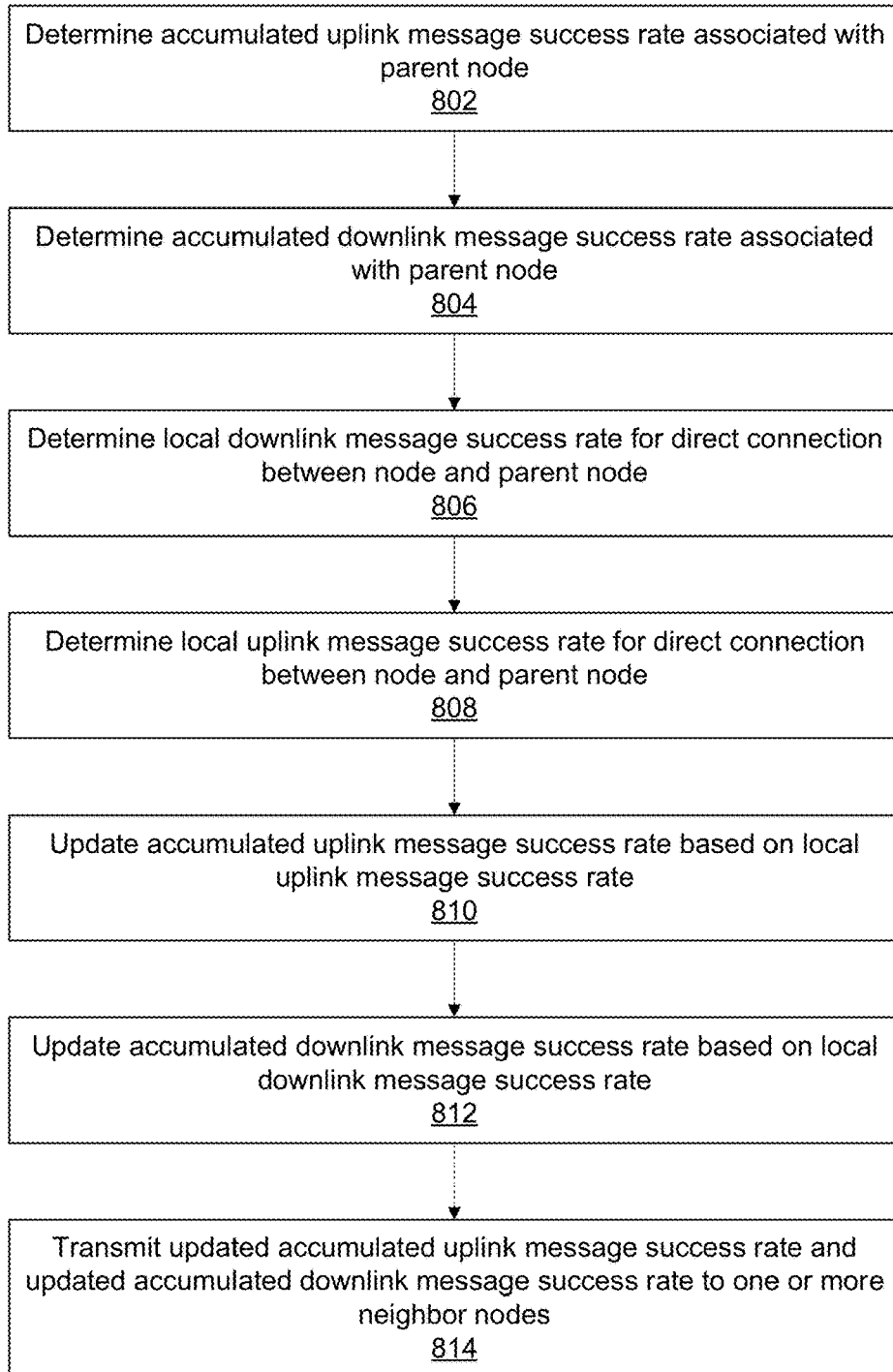
FIG. 8 is a flow diagram of method steps for determining accumulated message success rates, according to various embodiments.

FIG. 8 is a flow diagram of method steps for determining accumulated message success rates with respect to a node within a network, according to various embodiments. Although the method steps are described in conjunction with the systems of FIGS. 1-2, persons skilled in the art will understand that any system configured to perform the method steps in any order falls within the scope of the present disclosure.

As shown in FIG. 8, a method 800 begins at step 802, where a node determines an accumulated uplink message success rate associated with a parent node. In some embodiments, the node receives a periodic beacon from the parent node that includes success rate information associated with the parent node, such as an accumulated transmitted message success rate, an accumulated received message success rate, and one or more transmitted packet success rates. The node extracts the accumulated uplink message success rate from the success rate information included in the periodic beacon. In some embodiments, the node stores success rate information received from the parent node in a node table, such as NHT 250. The node reads the accumulated uplink message success rate from the entry corresponding to the parent node in the node table.

In step 804, the node determines an accumulated downlink message success rate associated with the parent node. In some embodiments, the node receives a periodic beacon from the parent node that includes success rate information associated with the parent node. The node extracts the accumulated downlink message success rate from the success rate information included in the periodic beacon. In some embodiments, the node stores the success rate information received from the parent node in an entry corresponding to the parent node in a node table, such as NHT 250. The node reads the accumulated downlink message success rate from the entry corresponding to the parent node in the node table.

In step 806, the node determines a local downlink message success rate associated with the direct connection between the node and the parent node. In some embodiments, the node pre-computes and stores the local downlink message success rate in an entry corresponding to the parent node in the node table. The node reads the local downlink message success rate from the entry in the node table. In some embodiments, the node computes the local downlink message success rate. Computing the local downlink message success rate is performed in a manner similar to that discussed above with respect to methods 500 and 600.

In step 808, the node determines a local uplink message success rate associated with the direct connection between the node and the parent node. In some embodiments, the node pre-computes and stores the local uplink message success rate in an entry corresponding to the parent node in the node table. The node reads the local uplink message success rate from the entry in the node table. In some embodiments, the node receives success rate information from the parent node, such as a transmit packet success rate, and computes the local uplink message success rate based on the success rate information from the parent node. Computing the local uplink message success rate is performed in a manner similar to that discussed above with respect to methods 500 and 600.

In step 810, the node updates the accumulated uplink message success rate associated with the parent node based on the local uplink message success rate to generate an accumulated uplink message success rate that is associated with the node. Generating an accumulated uplink message success rate for the node based on an accumulated uplink message success rate associated with the parent node is performed in a manner similar to that discussed above with respect to BPD node 320B and equation (10).

In step 812, the node updates the accumulated downlink message success rate associated with the parent node based on the local downlink message success rate to generate an accumulated downlink message success rate that is associated with the node. Generating an accumulated downlink message success rate for the node based on an accumulated downlink message success rate associated with the parent node is performed in a manner similar to that discussed above with respect to BPD node 320B and equation (9).

Optionally, in step 814, the node transmits the updated accumulated downlink message success rate and the updated accumulated uplink message success rate to one or more neighbor nodes. In some embodiments, the node includes the updated accumulated downlink message success rate and the updated accumulated uplink message success rate in periodic beacon transmissions to the one or more neighbor nodes.

Selecting Parent Nodes Using Accumulated Message Success Rates

In some embodiments, when joining the subtree 300, the software application 242 of a node is configured to perform a discovery process with one or more nodes in subtree 300 to discover a set of one or more potential parent nodes. Software application 242 is configured to determine accumulated message success rates associated with each potential parent node and select a target parent node from among the set of potential parent nodes based on the accumulated message success rates.

Figure 9:
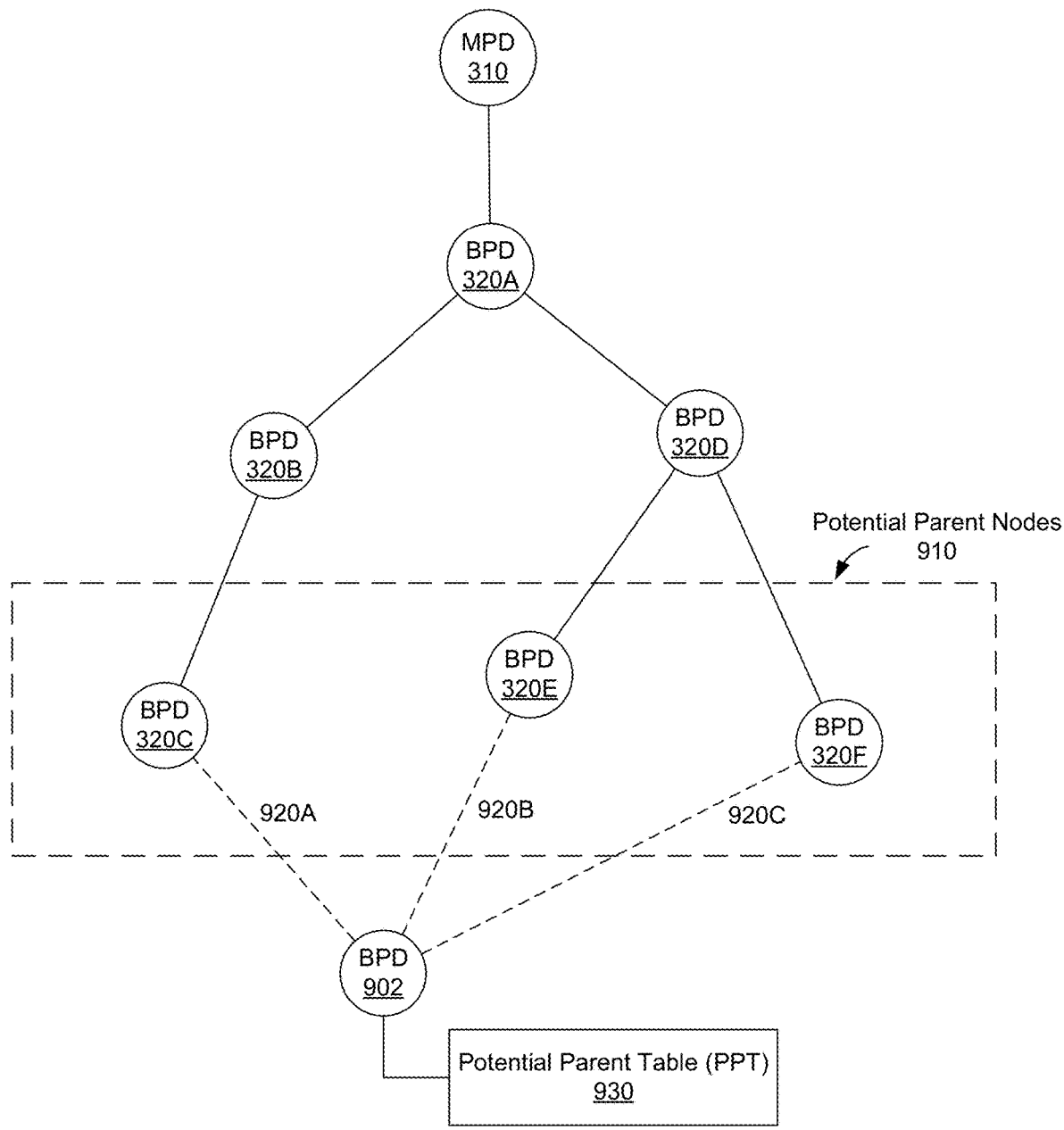
FIG. 9 illustrates a node joining the node subtree of FIG. 3, according to various embodiments.

FIG. 9 illustrates a joining BPD node 902 joining the subtree 300. As discussed above, subtree 300 includes MPD node 310 and a plurality of BPD nodes 320A-320F, and each node is configured to communicate directly with one or more adjacent nodes via a communication link 330. Subtree 300 is organized in a hierarchical structure, with a single root node (e.g., MPD node 310) and a plurality of child nodes (e.g., BPD nodes 320A-320F).

In some embodiments, when joining the subtree 300, joining BPD node 902 performs various operations to discover nearby nodes included in the subtree 300. BPD node 902 may use any technically feasible operations to discover nearby nodes. For example, BPD node 902 may transmit a plurality of discovery beacons and receive discovery beacon responses from nearby nodes. BPD node 902 tracks the nodes from which BPD node 902 received a discovery beacon response. In some embodiments, BPD node 902 identifies a set of potential parent nodes 910 (e.g., BPD nodes 320C, 320E, and 320F) from the discovered nearby nodes. Although FIG. 9 illustrates three BPD nodes 320 that are identified as potential parent nodes, any number of nodes and/or any type of node, including MPD nodes, may be identified as potential parent nodes.

Each potential parent node 910 has a potential communications link (e.g., 920A, 920B, 920C) with the joining BPD node 902. In some embodiments, the joining BPD node 902 uses the parent selection criteria 244 to evaluate each of the potential parent nodes 910 and the potential communication link 920 to the potential parent nodes 910. Based on the evaluation, the joining BPD node 902 selects a specific node from the potential parent nodes 910 as a target parent node. Once the joining BPD node 902 selects a specific BPD node 320 as the target parent node, the joining BPD node 902 communicates with the specific BPD node 320 in order to establish the potential communications link 920 as a bi-directional communications link in subtree 300.

In some embodiments, BPD node 902 generates a potential parent table (PPT) 930 that lists a group of nodes within the subtree 300 that are identified as potential parent nodes 910 (e.g., BPD nodes 320C, 320E, and 320F). Joining BPD node 902 generates entries for each potential parent node 910 in PPT 930. For example, BPD node 902 generates an entry in PPT 930 for BPD node 320C, BPD node 320E, and BPD node 320F.

In some embodiments, BPD node 902 determines one or more message success rates associated with a potential communications link to a potential parent node 910, such as one or more of a local uplink message success rate, a local downlink message success rate, an accumulated uplink message success rate, and/or an accumulated downlink message success rate. BPD node 902 stores the one or more message success rates in an entry in PPT 930 corresponding to the potential parent nodes 910. For example, BPD node 902 computes a local uplink message success rate, a local downlink message success rate, an accumulated uplink message success rate, and/or an accumulated downlink message success rate for potential communication link 920A to BPD node 320C, and stores the computed values in an entry in PPT 930 for BPD node 320C.

In some embodiments, BPD node 902 determines or receives additional node data, metrics, and/or communication link information associated with each potential communication link 920 and/or potential parent nodes 910, such as node type, communication link protocol, average RSSI (received signal strength indicator), average LSI (load size indicator), hop count to the root node, hop count to an access point, number of children, average time since last reboot, and the like. BPD node 902 stores the additional node data, metrics, and/or communication link information in the entry in PPT 930 for the corresponding potential parent nodes 910.

In some embodiments, the parent selection criteria 244 includes one or more pre-selection criteria. Software application 242 applies the one or more pre-selection criteria to filter the set of potential parent nodes. The one or more pre-selection criteria are based on features of the potential parent node and/or the potential communication link to the potential parent node. The features include, for example, percentage of BPD nodes used, time of last response received, LSI value, hop count to root node, routing load percentage, battery-backed routes available, IPv4 route available, and the like.

In some embodiments, the parent selection criteria 244 includes one or more message success rate criteria. Software application 242 applies the message success rate criteria to evaluate each potential parent node based on one or more accumulated message success rates computed for the potential parent node, such as an accumulated uplink message success rate and/or a combined accumulated message success rate.

In some embodiments, the parent selection criteria 244 includes one or more secondary selection criteria. Software application 242 uses the secondary selection criteria to select from a plurality of potential parent nodes that satisfy the pre-selection criteria and/or the message success rate criteria. In some embodiments, the secondary selection criteria include a hierarchy of different criterion. Software application 242 applies the different criterion in an order based on the hierarchy to filter the plurality of potential parent nodes in a multi-step evaluation and filtering process.

Figure 10:
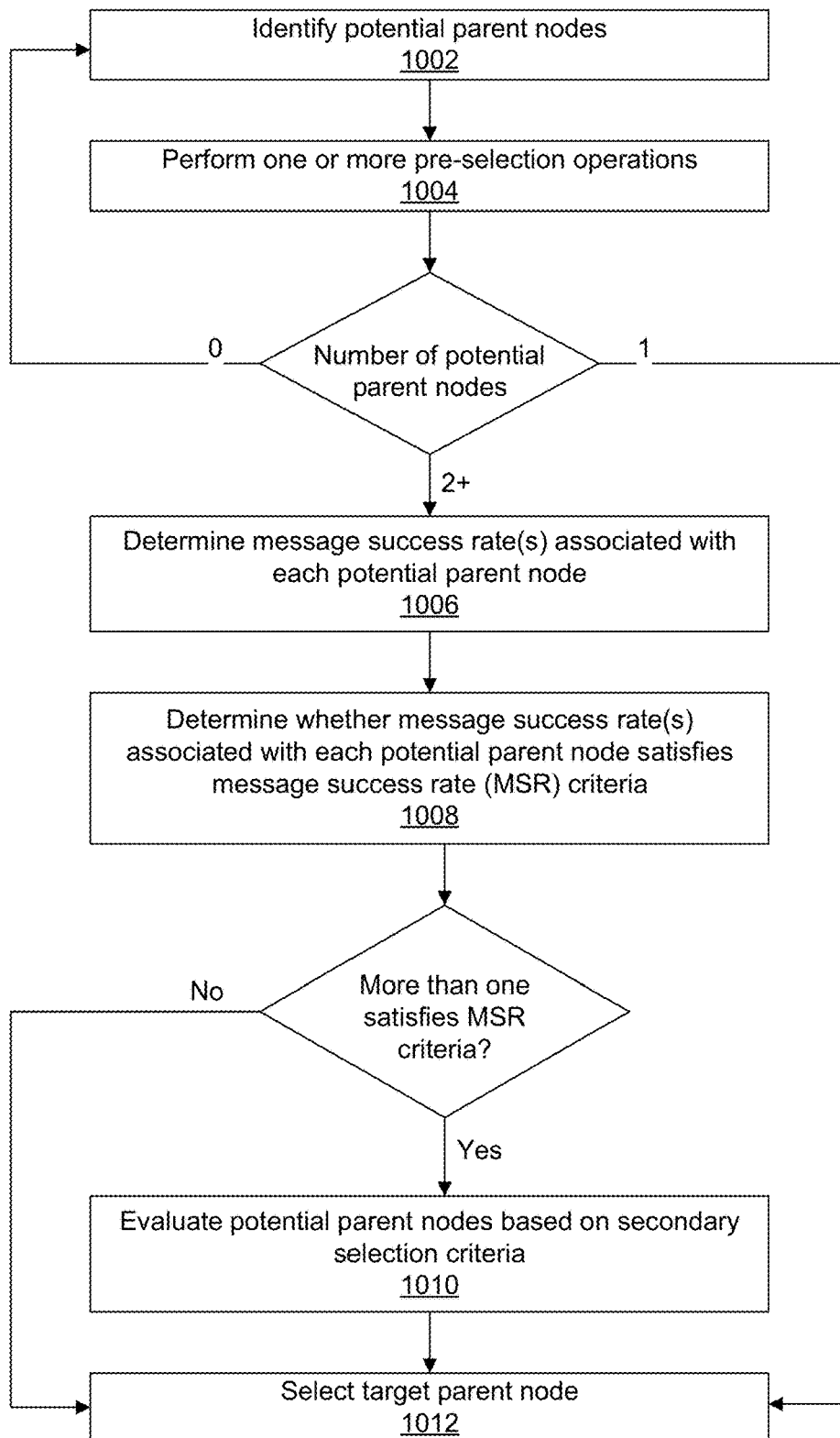
FIG. 10 is a flow diagram of method steps for selecting a parent node from a set of potential parent nodes, according to various embodiments.

FIG. 10 is a flow diagram of method steps for selecting a parent node from a set of potential parent nodes, according to various embodiments. Although the method steps are described in conjunction with the systems of FIGS. 1-2, persons skilled in the art will understand that any system configured to perform the method steps in any order falls within the scope of the present disclosure.

As shown in FIG. 10, a method 1000 begins at step 1002, where a joining node identifies one or more nearby nodes in a node subtree as potential parent nodes. For example, joining BPD node 902 identifies BPD node 320C, BPD node 320E, and BPD node 320F as potential parent nodes 910.

In step 1004, the joining node performs one or more pre-selection operations. In some embodiments, performing the one or more pre-selection operations includes generating and populating a potential parent table with the one or more potential parent nodes. An entry is created in the potential parent table for each potential parent node. For example, joining node 902 generates a potential parent table 930 that includes entries for each of BPD nodes 320C, 320E, and 320F.

In some embodiments, the node populates the entry for each potential parent node based on data values stored for the potential parent node in other node tables 248, such as a neighborhood table 250. For example, a neighborhood table may store, for each neighboring node, success rate information associated with the neighboring node. The joining node determines success rate information for each potential parent node based on the success rate information stored in the neighborhood table and stores the success rate information in the corresponding entry in the potential parent table.

In some embodiments, performing the one or more pre-selection operations includes applying one or more pre-selection criteria to filter the set of potential parent nodes. The one or more pre-selection criteria are based on features of the potential parent node and/or the potential communication link to the potential parent node. The features include, for example, percentage of BPD nodes used, time of last response received, LSI value, hop count to root node, routing load percentage, battery-backed routes available, IPv4 route available, and the like. The one or more pre-selection criteria include, for example, whether the percentage of BPD nodes used is a particular value; whether the time of last response received exceeds a threshold value; whether the LSI value exceeds a threshold value; whether the hop count to the root node equals or exceeds a threshold value; whether the routing load percentage is a particular value; whether a battery-backed route is available; and/or whether an IPv4 route is available.

After performing the one or more pre-selection operations, if no potential parent nodes remain, then the method returns to step 1002 where the joining node identifies one or more potential parent nodes. If a single potential parent node remains, then the method proceeds to step 1012, where the remaining potential parent node is selected as the target parent node. If multiple potential parent nodes remain, then the method proceeds to step 1006.

At step 1006, the joining node determines one or more message success rates associated with each potential parent node. The one or more message success rates include one or more of a combined local message success rate, an accumulated downlink message success rate, an accumulated uplink message success rate, and/or a combined accumulated message success rate. In some embodiments, the combined local message success rate comprises a combination of a local downlink message success rate and a local uplink message success rate. In some embodiments, the combined accumulated message success rate comprises a combination of an accumulated downlink message success rate and an accumulated uplink message success rate.

As an example, joining BPD node 902 determines or computes one or more message success rates for each of BPD node 320C, BPD node 320E, and BPD node 320F. In some embodiments, the joining BPD node 902 stores the one or more message success rate values for a potential parent node in an entry corresponding to the potential parent node in the potential parent table 930.

In some embodiments, the node computes or determines a local uplink message success rate and a local downlink message success rate associated with the potential parent node. For example, the node can compute or determine the local uplink message success rate and the local downlink message success rate using success rate information stored in the neighborhood table and/or the potential parent table, such as values used to compute the local uplink message success rate and the local downlink message success rate or values for the local uplink message success rate and the local downlink message success rate themselves.

In some embodiments, the node determines an accumulated uplink message success rate and an accumulated downlink message success rate associated with the potential parent node. For example, the node can determine the accumulated uplink message success rate and the accumulated downlink message success rate by reading the values in an entry associated with the potential parent node from the neighborhood table and/or the potential parent table.

In some embodiments, the node computes a comparison message success rate for each potential parent node. The comparison message success rate may be based on the local uplink message success rate, a combination of the local uplink message success rate and the local downlink message success rate (combined local message success rate), the accumulated uplink message success rate, or a combination of the accumulated uplink message success rate and the accumulated downlink message success rate (combined accumulated message success rate).

In some embodiments, the node computes the comparison message success rate based on the local uplink message success rate. An example function for computing the comparison message success rate based on the local uplink success rate is given by equation (11):

$$\text{CompareMSR} = (\text{ULMSR}/1000 + \text{offset}) \quad (11)$$

In equation (11), ULMSR corresponds to the local uplink message success rate computed for the potential parent node and offset corresponds to the pre-defined value for offsetting message success rates. In some embodiments, message success rates are expressed in a specific resolution and/or offset into a specific value range. As shown in equation (11), ULMSR is divided by 1000 to scale the value back to an original resolution and offset is added back into the value. In some embodiments, the scaled and/or offset value for ULMSR is used instead.

In some embodiments, the node computes the comparison message success rate based on a combination of the local uplink message success rate and the local downlink message success rate. An example function for computing the comparison message success rate based on a combination of the local uplink message success rate and the local downlink message success rate is given by equation (12):

$$\text{CompareMSR}=(\text{DLMSR}/1000+\text{offset})\times(\text{ULMSR}/1000+\text{offset}) \quad (12)$$

In some embodiments, the node computes an accumulated uplink message success rate for each potential parent node. An example function for computing the accumulated uplink message success rate for a potential parent node is given by equation (13):

$$\text{AULMSR}=(\text{ULMSR}/250)\times(\text{nhtAULMSR}/1000+\text{offset}) \quad (13)$$

In equation (13), ULMSR represents the local uplink message success rate for the potential parent node and nhtAULMSR represents the accumulated uplink message success rate computed by the potential parent node. In some embodiments, the node receives the values for ULMSR and nhtAULMSR from the potential parent node, e.g., included in a periodic beacon received from the potential parent node. The accumulated uplink message success rate computed by the potential parent node may be included in success rate information received from the potential parent node and/or stored in an entry for the potential parent node in a node table 248, such as neighborhood table 250.

In some embodiments, the node computes an accumulated downlink message success rate for each potential parent node. An example function for computing the accumulated downlink message success rate for a potential parent node is given by equation (14):

$$\text{ADLMSR}=(\text{DLMSR})\times(\text{nhtADLMSR}/1000+\text{offset}) \quad (14)$$

In equation (14), DLMSR represents the local downlink message success rate for the potential parent node. In some embodiments, DLMSR is computed by raising the local periodic beacon success rate to the power of the number of retry attempts used to successfully transmit downlink data messages. In some embodiments, DLMSR is computed in a manner similar to that shown above in equation (2). nhtADLMSR represents the accumulated downlink message success rate computed by the potential parent node. In some embodiments, the node receives the value of nhtADLMSR from the potential parent node, e.g., included in a periodic beacon received from the potential parent node. The accumulated downlink message success rate computed by the potential parent node may be included in success rate information received from the potential parent node and/or stored in an entry for the potential parent node in a node table 248, such as neighborhood table 250.

In some embodiments, the node computes the comparison message success rate based on the accumulated uplink message success rate. An example function for computing the comparison message success rate based on the accumulated uplink success rate is given by equation (15):

$$\text{CompareMSR}=\text{AULMSR} \quad (15)$$

In some embodiments, the node computes the comparison message success rate based on a combination of the accumulated uplink message success rate and the accumulated downlink message success rate. An example function for computing the comparison message success rate based on a combination of the accumulated uplink message success rate and the accumulated downlink message success rate is given by equation (16):

$$\text{CompareMSR}=(\text{ADLMSR})\times(\text{AULMSR}) \quad (16)$$

In some embodiments, if the potential parent node is a MPD node, the node computes the comparison message success rate for the potential parent node based on either a local uplink message success rate or a combined local message success rate. If the potential parent node is a BPD node, the node computes the comparison message success rate for the potential parent node based on either an accumulated uplink message success rate or a combined accumulated message success rate. In some embodiments, the node computes the comparison message success rate for a MPD node based on a local uplink message success rate and the comparison message success rate for a BPD node based on an accumulated uplink message success rate. In some embodiments, the node computes the comparison message success rate for a MPD node based on a combined local message success rate and the comparison message success rate for a BPD node based on a combined accumulated message success rate.

At step 1008, the joining node determines, for each potential parent node, whether the one or more message success rates associated with the potential parent node satisfies one or more message success rate criteria. For example, joining BPD node 902 determines whether each of BPD node 320C, BPD node 320E, and BPD node 320F satisfy the one or more message success rate criteria.

In some embodiments, the one or more message success rate criteria includes a threshold value associated with the comparison message success rate. The joining node determines whether the comparison message success rate of the potential parent node is greater than or equal to the threshold value. Additionally, in some embodiments, the one or more message success rate criteria include a threshold margin value. The joining node determines the potential parent node with the highest comparison message success rate that is greater than or equal to the threshold value. For the remaining potential parent nodes, if the comparison message success rate is greater than or equal to the threshold value, the joining node determines whether the comparison message success rate differs from the highest comparison message success rate by an amount that is less than the threshold margin value.

After applying the one or more message success rate criteria, if a single potential parent node satisfies the one or more message success rate criteria, then the method 1000 proceeds to step 1012, where the joining node selects that potential parent node as the target parent node.

If no potential parent node satisfies the one or more message success rate criteria, then the joining node determines the potential parent node with the highest comparison message success rate, and selects the potential parent node as the target parent node.

If multiple potential parent nodes satisfy the one or more message success rate criteria, then the method 1000 proceeds to step 1010. In step 1010, the joining node evaluates the remaining potential parent nodes based on one or more secondary selection criteria. The different criterion can include, for example, whether the average time between reboots is greater than or equal to a minimum amount; whether the potential parent node was previously used by the node as a parent node; whether the potential parent node has an active security session key, and if so, whether the key expiration and link expiration times are valid; whether the potential parent node is connected to an MPD node or is an MPD node; which potential parent node has the lowest percent BPD used; which potential parent node has the lowest LSI, if maximizing the number of nodes that have children; which potential parent node has the highest LSI, if minimizing the number of nodes that have children; which potential parent node has the lowest hop count, if minimizing hop counts.

In some embodiments, the secondary selection criteria include a hierarchy of the different criterion. The joining node applies the different criterion in an order based on the hierarchy to filter the plurality of potential parent nodes in a multi-step evaluation and filtering process. At each step, the joining node applies a different criterion and, if multiple parent nodes satisfy the different criterion, then the joining node proceeds to apply the next criterion. If a single potential parent node satisfies the criterion, then that potential parent node is selected as the target parent node. In some embodiments, if no potential parent nodes satisfy the criterion, then the potential parent node that best satisfies the criterion is selected as the target parent node. For example, for a criterion that determines whether a feature value is greater than or equal to a threshold amount, the potential parent node with the highest feature value could be selected. In some embodiments, if no potential parent nodes satisfy the criterion, the target parent node is randomly selected from the remaining potential parent nodes.

At step 1012, the joining node selects the target parent node. The joining node performs one or more operations to associate with the target parent node. Once association with the target parent node is completed, then the communication link between the joining node and the target parent node is established, and the joining node becomes part of the node subtree 300.

As discussed above, typical approaches for evaluating connections to potential parent nodes only account for downlink reliability, i.e., whether the node is reliably receiving messages transmitted by the neighboring node. In contrast, with the disclosed approach, potential parent nodes are evaluated based on both the local uplink message success rate and the local downlink message success rate. Furthermore, potential parent nodes are evaluated based on both the accumulated uplink message success rate and the accumulated downlink message success rate. Therefore, evaluating potential parent nodes accounts for uplink reliability and downlink reliability of the direct connection to the potential parent node as well as the uplink reliability and downlink reliability of the intermediary connections from the potential parent node to the root node of the node subtree. Accordingly, the disclosed approach enables a joining node to select a target parent node that provides a reliable path for transmitting messages to and receiving messages from a target destination within network 110.

As an example, the quality of the connection to a first potential parent node may be better than the quality of the connection to a second potential parent node. Using prior art techniques, the first potential parent node would be selected as the target parent node. However, if the quality of the intermediary connection(s) between the first potential parent node and the target destination is poor, then the overall communication path between the node and the target destination via the first potential parent node may not be reliable. Using the disclosed techniques, the accumulated message success rates for the first potential parent node would reflect the poor quality of the intermediary connection(s).

Similarly, if the quality of the intermediary connection(s) between the second potential parent node and the target destination is better than the quality of the intermediary connection(s) between the first potential parent node and the target destination, then the overall communication path between the node and the target destination via the second potential parent node may be more reliable. The accumulated message success rates for the second potential parent node would reflect the higher reliability of the intermediary connection(s). Therefore, even though the quality of the direct connection to the second potential parent node is worse than the quality of the direct connection to the first potential parent node, the node may determine that the second potential parent node provides a more reliable path to the target destination and select the second potential parent node as the target parent node.

Evaluating Established Connections Using Message Success Rates

After a node has joined subtree 300 and established a communication link with a selected parent node, the node transmits messages to target destinations within network 110 and receives messages from other locations within network 110 via the communication link with the selected parent node. However, over time, the quality of the direct connection with the parent node may change and/or the quality of the intermediary connections between the parent node and other locations within the network 110 may change. Additionally, over time, additional nodes may join the subtree, and the quality of the potential connection between the node and a new node may be better than the quality of the established connection to the parent node.

In some embodiments, the software application 242 of a node is configured to periodically evaluate the quality of the connection with the parent node. Software application 242 is configured to compute accumulated message success rates associated with the parent node and evaluate the quality of the connection with the parent node based on the accumulated message success rates to determine whether to select a different parent node.

Figure 11:
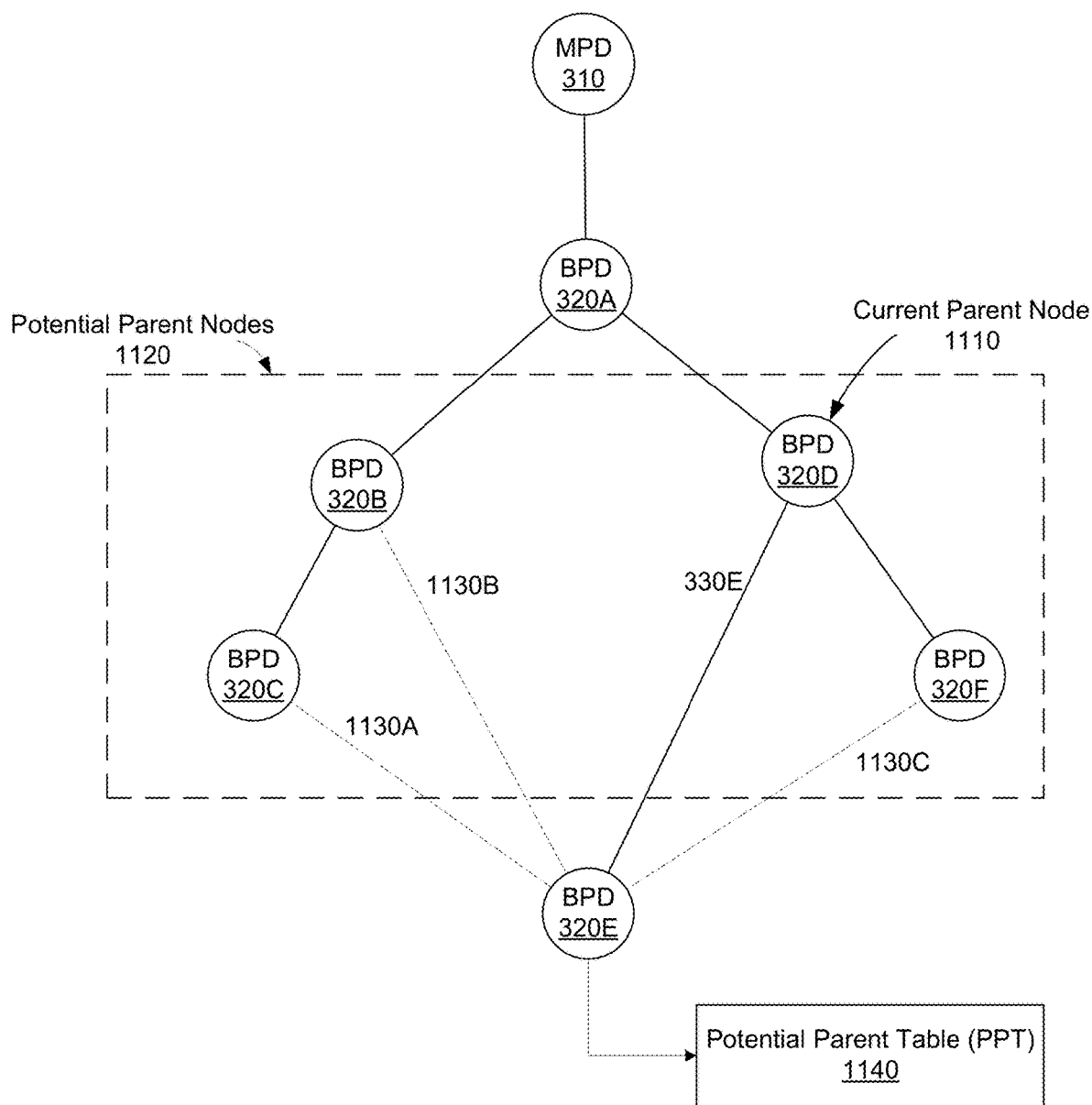
FIG. 11 illustrates a node evaluating an established connection in the node subtree of FIG. 3, according to various embodiments.

FIG. 11 illustrates a node evaluating a connection to an established parent in subtree 300. As discussed above, subtree 300 includes MPD node 310 and a plurality of BPD nodes 320A-320F, and each node is configured to communicate directly with one or more adjacent nodes via a communication link 330. Subtree 300 is organized in a hierarchical structure, with a single root node (e.g., MPD node 310) and a plurality of child nodes (e.g., BPD nodes 320A-320F). When joining subtree 300, a node identifies one or more potential parent nodes from the nodes of subtree 300 and selects one of the potential parent nodes as a target parent node. After selecting a node as its parent node, the node establishes a communication link with the parent node and communicates with other nodes in the network via the communication link. As shown in FIG. 11, the current parent node 1110 of BPD node 320E is BPD node 320D. BPD node 320E communicates with BPD node 320D via communication link 330E.

In some embodiments, BPD node 320E computes or determines one or more message success rates associated with BPD node 320D, such as one or more of a local uplink message success rate, a local downlink message success rate, an accumulated uplink message success rate, an accumulated downlink message success rate, or a combined accumulated message success rate. In some embodiments, BPD node 320E stores the one or more message success rates in an entry in NHT 250 corresponding to BPD node 320D.

In some embodiments, BPD node 320E determines whether to check for a new parent node based on whether a message success rate included in the one or more message success rates is less than a threshold value. For example, BPD node 320E could determine that a new parent node should be selected if the accumulated uplink message rate for the current parent node 1110 is less than a threshold value. In some embodiments, the node determines a threshold value based on a node type of the parent node and/or the communication link protocol of the communication link with the parent node. For example, if the parent node is connected to a MPD node, i.e., is a direct connected node, then a threshold amount associated with direct connected nodes is used. If the parent node is connected to another BPD node, i.e., is an extended child node, then a threshold amount associated with extended child nodes is used.

If BPD node 320E determines that a new parent node should be selected, then BPD node 320E performs one or more operations to discover nearby nodes included in subtree 300 and identify a set of one or more potential parent nodes 1120 from the nearby nodes. As shown, BPD node 320E identifies BPD node 320B, BPD node 320C, BPD node 320D, and BPD node 320F as potential parent nodes. Notably, the set of potential parent nodes 1120 can include the current parent node 1110.

In some embodiments, BPD node 320E generates a potential parent table (PPT) 1140 that lists a group of nodes within the subtree 300 that are identified as potential parent nodes 1120 (e.g., BPD nodes 320B, 320C, 320D, and 320F). BPD node 320E generates entries for each potential parent node 1120 in PPT 1140. For example, BPD node 320E generates an entry in PPT 1140 for BPD node 320B, BPD node 320C, BPD node 320D, and BPD node 320F.

Each potential parent node 1120 has a potential communications link (e.g., 1130A, 1130B, 1130C) with BPD node 320E. In some embodiments, BPD node 320E uses parent selection criteria 244 to evaluate each of the potential parent nodes 1120 and potential communication links 1130 to the potential parent nodes 1120. Based on the evaluation, BPD node 320E selects a target parent node from the set of potential parent nodes 1120.

If the potential parent nodes 1120 includes the current parent node 1110, BPD node 320E could select the current parent node 1110 as the target parent node. In such cases, BPD node 320E maintains the established connection with the current parent node 1110. For example, if BPD node 320E selects BPD node 320D as the target parent node, then BPD node 320E maintains communication link 330E with BPD node 320D.

If the target parent node is not the current parent node 1110, then BPD node 320E performs one or more operations to migrate the connection from BPD node 320D to the target parent node. For example, if BPD node 320E selects BPD node 320F as a new parent node, then BPD node 320E communicates with BPD node 320F to establish potential communications link 1130 as a communication link in subtree 300. Additionally, BPD node 320E could communicate with BPD node 320D to remove the communication link 330E. In some embodiments, BPD node 320E updates its neighborhood table 250 to indicate that BPD node 320D is no longer a parent node and that BPD node 320F is now a parent node. Additionally, BPD node 320D could update its neighborhood table 250 to indicate that BPD node 320E is no longer a child node, and BPD node 320F could update its neighborhood table 250 to indicate that BPD node 320E is now a child node.

Figure 12:
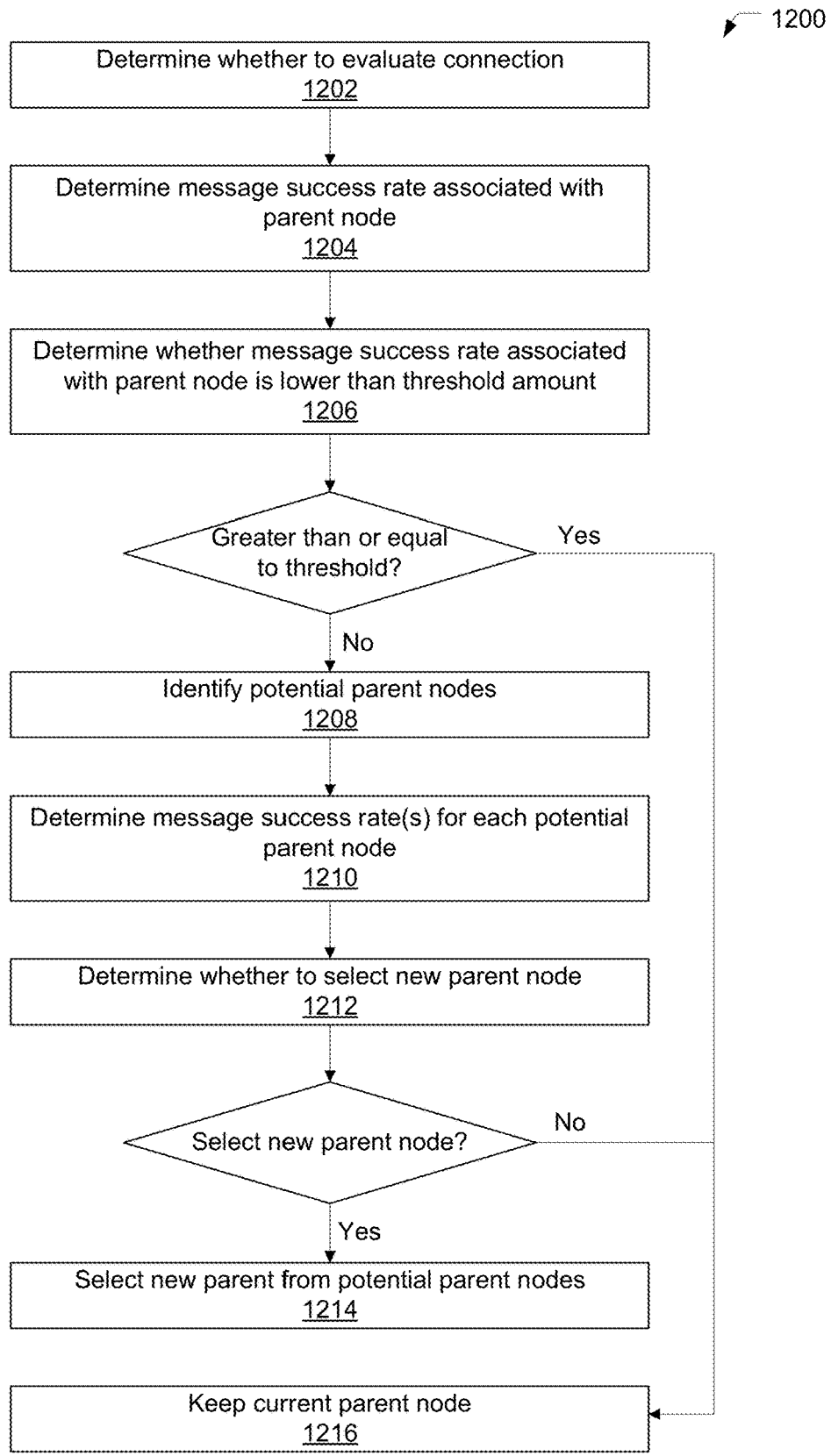
FIG. 12 is a flow diagram of method steps for evaluating a connection with an established parent node, according to various embodiments.

FIG. 12 is a flow diagram of method steps for evaluating a connection with an established parent node, according to various embodiments. Although the method steps are described in conjunction with the systems of FIGS. 1-2, persons skilled in the art will understand that any system configured to perform the method steps in any order falls within the scope of the present disclosure.

As shown in FIG. 12, a method 1200 begins at step 1202, where a node determines whether to evaluate the connection to its parent node. For example, BPD node 320E determines whether to evaluate communication link 330E to BPD node 320D. In some embodiments, the node periodically re-evaluates the connection to its parent node until one or more stop conditions occur. The one or more stop conditions may be, for example, receiving a stop operation request, a network connection change, the node selecting a new parent outside of the connection evaluation process, and so forth.

While continuing to evaluate the connection, the node determines a delay period and waits for the delay period to expire. After the delay period, the node evaluates the connection to its parent node. In some embodiments, the delay period is a fixed amount of time, e.g., an hour, a day, a week, or any other suitable period of time. In some embodiments, the node selects a random value within a range of possible delay period values.

In step 1204, the node determines an accumulated message success rate associated with the parent node. The accumulated message success rate could be, for example, an accumulated uplink message success rate, an accumulated downlink message success rate, or a combined accumulated message success rate.

In some embodiments, the node computes an accumulated uplink message success rate and/or an accumulated downlink message success rate. Computing an accumulated uplink message success rate and/or an accumulated downlink message success rate is performed in a manner similar to that discussed above with reference to method 800. In some embodiments, the node retrieves a pre-computed accumulated uplink message success rate and/or accumulated downlink message success rate. For example, the node could compute the accumulated uplink message success rate and/or the accumulated downlink message success rate at a first time, and store the values in database 246. At a later time, the node retrieves the uplink message success rate and/or the accumulated downlink message success rate from database 246.

In some embodiments, the node computes a combined accumulated message success rate. An example function for computing a combined accumulated message success rate is given by equation (17):

$$CompAMSR=(ADLMSR/1000+\text{offset})\times(AULMSR/1000+\text{offset}) \quad (17)$$

In some embodiments, if the node is a direct connected node, then the combined accumulated message success rate is equal to the value of a combined local message success rate for the node. In other words, the node computes a combined local message success rate instead of a combined accumulated message success rate. An example function for computing the combined local message success rate is given by equations (11) and (12) above.

In step 1206, the node determines whether the accumulated message success rate associated with the parent node is less than a threshold amount. In some embodiments, the node determines a threshold amount based on a node type of the parent node. For example, if the parent node is connected to a MPD node, i.e., is a direct connected node, then a threshold amount associated with direct connected nodes is used. If the parent node is connected to another BPD node, i.e., is an extended child node, then a threshold amount associated with extended child nodes is used.

If the accumulated message success rate is greater than or equal to the threshold amount, then the method 1200 proceeds to step 1216, where the node keeps the current parent node and does not select a different parent node. Otherwise, if the accumulated message success rate is less than the threshold amount, then the method 1200 proceeds to step 1208.

In step 1208, the node identifies a set of potential parent nodes from one or more nearby nodes in the node subtree. For example, BPD node 320E identifies BPD node 320B, BPD node 320C, BPD node 320E, and BPD node 320F as potential parent nodes.

In step 1210, the node determines, one or more message success rates associated with each potential parent node. The one or more message success rates include one or more of a combined local message success rate, an accumulated downlink message success rate, an accumulated uplink message success rate, and/or a combined accumulated message success rate.

In some embodiments, the node computes or determines a local uplink message success rate and a local downlink message success rate associated with the potential parent node. For example, the node can compute or determine the local uplink message success rate and the local downlink message success rate using success rate information stored in the neighborhood table and/or the potential parent table, such as values used to compute the local uplink message success rate and the local downlink message success rate or values for the local uplink message success rate and the local downlink message success rate themselves.

In some embodiments, the node computes or determines an accumulated uplink message success rate for each potential parent node. An example function for computing the accumulated uplink message success rate for a potential parent node is given by equation (13) above.

In some embodiments, the node computes or determines an accumulated downlink message success rate for each potential parent node. An example function for computing the accumulated downlink message success rate for a potential parent node is given by equation (14) above.

In some embodiments, the node computes a comparison message success rate for each potential parent node. The comparison message success rate may be based on the local uplink message success rate, a combination of the local uplink message success rate and the local downlink message success rate, the accumulated uplink message success rate, or a combination of the accumulated uplink message success rate and the accumulated downlink message success rate. In some embodiments, the node computes the comparison message success rate based on only the local uplink message success rate. In some embodiments, the node computes the comparison message success rate based on a combination of the local uplink message success rate and the local downlink message success rate. In some embodiments, the node computes the comparison message success rate based on only the accumulated uplink message success rate. In some embodiments, the node computes the comparison message success rate based on a combination of the accumulated uplink message success rate and the accumulated downlink message success rates. Example functions for computing the comparison message success rate are given by equations (11), (12), (15), and (16) above.

In some embodiments, the node selects which type of comparison message success rate to use based on the type of node of the potential parent node. In some embodiments, the node computes the comparison message success rate for a MPD node based on a local uplink message success rate and the comparison message success rate for a BPD node based on an accumulated uplink message success rate. In some embodiments, the node computes the comparison message success rate for a MPD node based on a combined local message success rate and the comparison message success rate for a BPD node based on a combined accumulated message success rate.

At step 1212, the node determines whether to select a different parent node based on the message success rates associated with the potential parent nodes. The node compares one or more message success rates associated with the current parent node 1110 with the one or more message success rates of each potential parent node 1120. In some embodiments, the node compares a comparison message success rate of each potential parent node with the comparison message success rate of the current parent node.

In some embodiments, the type of message success rate used to compare each potential parent node with the current parent node depends on the node type of the potential parent node and/or the communication link protocol of the communication link with the potential parent node. Additionally, the type of message success rate used for the current parent node could depend on the node type of the current parent node. Accordingly, different types of message success rates could be used for each potential parent node and the current parent node. For example, if a potential parent node is a direct connected node, then the combined local message success rate could be used for the potential parent node. If the potential parent node is an extended child node, then the combined accumulated message success rate could be used. Similarly, the combined local message success rate could be used for the current parent node if the current parent node is a direct connected node, while the combined accumulated message success rate could be used if the current parent node is an extended child node.

If the comparison message success rate (e.g., local uplink message success rate, combined local message success rate, accumulated uplink message success rate, or combined accumulated message success rate) associated with the current parent node 1110 is higher than the comparison message success rate of each of the potential parent nodes 1120, then the method 1200 proceeds to step 1216, where the node keeps the current parent node 1110. Otherwise, the node determines that a different parent node should be selected, and the method 1200 proceeds to step 1214.

In step 1214, the node selects a new parent node from the set of potential parent nodes. Selecting a new parent node from a set of potential parent nodes is performed in a manner similar to that disclosed above in method 1000. In some embodiments, selecting the new parent node includes filtering the set of potential parent nodes based on one or more pre-selection criteria. In some embodiments, selecting the new parent node includes filtering the set of potential parent nodes, or a subset of the potential parent nodes, based on one or more message success rate criteria. In some embodiments, selecting the new parent node includes filtering the set of potential parent nodes, or a subset of the potential parent nodes, based on one or more secondary selection criteria.

After selecting a new parent node, the node establishes a communication link to the new parent node and removes the communication link to the previous parent node.

In order to reduce battery power consumption, after a BPD node has joined a subtree and selected a parent node, the BPD node typically does not re-evaluate its connection to the parent node. If the connection quality of the direct connection to the parent node changes, if the connection quality of intermediary connections change, and/or if additional nodes are added to the subtree, the BPD node continues to maintain the connection to the parent node. Therefore, even if the BPD node initially selected a parent node that provided a reliable path for transmitting messages to and from a target destination, the path may become unreliable over time or other, more reliable, paths may become available.

Using the disclosed techniques, a node periodically re-evaluates an established connection to a parent node. The node is able to determine when the quality of the established connection is poor, and a new parent node should be selected. Furthermore, the message success rates can be computed using a relatively small number of messages and/or can be computed based on regular data message transmissions, i.e., messages that are not specific to performing link evaluation. Therefore, the node is able to perform the connection evaluation without significant power consumption and resource overhead.

In sum, the disclosed techniques use message success rates to evaluate connections between a node and parent node or potential parent nodes. A node computes a local uplink message success rate and a local downlink message success rate associated with a direct connection between the node and a parent node or potential parent node. The local uplink message success rate indicates a reliability of sending messages to the parent node or potential parent node via the direct connection. The local downlink message success rate indicates a reliability of receiving messages from the parent node or the potential parent node via the direct connection.

The node also computes an accumulated uplink message success rate and an accumulated downlink message success rate. The accumulated uplink message success rate is computed based on the local uplink message success rate associated with the direct connection between the node and a parent node or a potential parent node, as well as an accumulated uplink message success rate associated with one or more intermediary connections between the parent node or the potential parent node and a target destination. The accumulated uplink message success rate indicates a reliability of sending messages to the target destination via the parent node, or the potential parent node, and the one or more intermediary connections. The accumulated downlink message success rate is computed based on the local downlink message success rate associated with the direct connection between the node and a parent node or a potential parent node, as well as an accumulated downlink message success rate associated with one or more intermediary connections between the parent node or the potential parent node and a target destination. The accumulated downlink message success rate indicates a reliability of receiving messages from the target destination via the parent node, or the potential parent node, and the one or more intermediary connections.

The node uses local downlink message success rates, local uplink message success rates, accumulated downlink message success rates, and/or accumulated uplink message success rates to evaluate connections between the node and different potential nodes to select a neighboring node as a parent node. For example, the node could filter a set of potential parent nodes based on a threshold accumulated uplink message success rate to identify a target parent node. As another example, the node could select the potential parent node having the highest accumulated uplink message success rate and/or highest combined accumulated uplink message success rate and accumulated downlink message success rate.

After the node has selected a parent node, the node uses the accumulated uplink message success rate and/or accumulated downlink message success rate to evaluate the connection to the parent node and determine whether a different parent node should be selected. For example, the node could determine that a different parent node should be selected if the accumulated uplink message success rate is below a threshold amount. The node can also use local downlink message success rates, local uplink message success rates, accumulated downlink message success rates, and/or accumulated uplink message success rates to evaluate connections between the node and different neighboring nodes to determine whether any neighboring nodes would be a better parent node than the current parent node. For example, if none of the accumulated uplink message success rates of the neighboring nodes is higher than the accumulated uplink message success rate of the current parent node, then the node maintains the current parent node, even though the accumulated uplink message success rate of the current parent node is below the threshold amount. However, if at least one of the accumulated uplink message success rates is higher than the accumulated uplink message success rate, then the node performs a parent selection process using the neighboring nodes.

One technical advantage of the disclosed techniques relative to the prior art is that the disclosed techniques enable a given node within a mesh network to evaluate connection quality between itself and a neighbor node based on both the quality of the direct connection between itself and the neighbor node as well as the quality of the intermediary connections along a path from itself to a target destination. Accordingly, with the disclosed techniques, a given node in a mesh network is able to account for message transmission reliability both to and from a target destination when evaluating connection quality between itself and one or more neighboring nodes. Another technical advantage is that the disclosed techniques enable a given node within a mesh network to evaluate connection quality using a relatively small number messages between itself and various neighbor nodes. Accordingly, the disclosed techniques, when implemented, reduce power consumption and resource overhead for a given node relative to conventional approaches that require a node to exchange numerous messages with neighboring nodes. These technical advantages provide one or more technological improvements over prior art approaches.

1. In some embodiments, a computer-implemented method for evaluating connections between nodes in a mesh network comprises determining, at a first node, one or more first accumulated message success rates associated with transmitting messages from the first node to a target destination within the mesh network via an established parent node and with receiving messages from the target destination via the established parent node; determining, based on the one or more first accumulated message success rates, that a search for a different parent node should be performed; identifying a plurality of potential parent nodes; computing, for each potential parent node, one or more second accumulated message success rates associated with transmitting messages from the first node to a target destination within the mesh network via the potential parent node and with receiving messages from the target destination via the potential parent node; and based on the second accumulated message success rates, selecting a new parent node from the plurality of potential parent nodes or maintaining the established parent node.

2. The computer-implemented method of clause 1, wherein the one or more first accumulated message success rates includes an accumulated uplink message success rate that indicates a probability of successfully transmitting, from the first node, messages transmitted from the first node to the target destination via the established parent node.

3. The computer-implemented method of clauses 1 or 2, wherein determining that a search for a different parent should be performed comprises determining that the accumulated uplink message success rate is lower than a threshold amount.

4. The computer-implemented method of any of clauses 1-3, wherein the one or more first accumulated message success rates includes a combined accumulated message success rate that is based on an accumulated uplink message success rate that indicates a probability of successfully transmitting messages from the first node to the target destination via the established parent node and an accumulated downlink message success rate that indicates a probability of successfully receiving, at the first node, messages transmitted to the first node from the target destination via the established parent node.

5. The computer-implemented method of any of clauses 1-4, wherein determining that a search for a different parent should be performed comprises determining that the combined accumulated message success rate is lower than a threshold amount.

6. The computer-implemented method of any of clauses 1-5, wherein the one or more second accumulated message rates includes an accumulated uplink message success rate, and wherein selecting the new node from the plurality of potential parent nodes or maintaining the established parent node comprises determining that an accumulated uplink message success rate associated with at least one potential parent node is greater than an accumulated uplink message success rate associated with the established parent node; and selecting the new parent node from the plurality of potential parent nodes.

7. The computer-implemented method of any of clauses 1-6, wherein the one or more second accumulated message rates includes an accumulated uplink message success rate, and wherein selecting a new node from the plurality of potential parent nodes or maintaining the established parent node comprises determining that no accumulated uplink message success rate associated with the plurality of potential parent nodes is greater than an accumulated uplink message success rate associated with the established parent node; and maintaining the established parent node.

8. The computer-implemented method of any of clauses 1-7, wherein the one or more second accumulated message rates includes a combined accumulated message success rate, and wherein selecting a new node from the plurality of potential parent nodes or maintaining the established parent node comprises determining that a combined accumulated message success rate associated with at least one potential parent node is greater than a combined accumulated message success rate associated with the established parent node; and selecting the new parent node from the plurality of potential parent nodes.

9. The computer-implemented method of any of clauses 1-8, wherein the one or more second accumulated message rates includes a combined accumulated message success rate, and wherein selecting a new node from the plurality of potential parent nodes or maintaining the established parent node comprises determining that no combined accumulated message success rate associated with the plurality of potential parent nodes is greater than a combined accumulated message success rate associated with the established parent node; and maintaining the established parent node.

10. The computer-implemented method of any of clauses 1-9, wherein the established parent node is included in the plurality of potential parent nodes, and wherein maintaining the established parent node comprises selecting the established parent node from the plurality of potential parent nodes.

11. In some embodiments, one or more non-transitory computer-readable media store instructions which, when executed by one or more processors, cause the one or more processors to perform the steps of determining, at a first node, one or more first accumulated message success rates associated with transmitting messages from the first node to a target destination within a mesh network via an established parent node and with receiving messages from the target destination via the established parent node; determining, based on the one or more first accumulated message success rates, that a search for a different parent node should be performed; identifying a plurality of potential parent nodes; computing, for each potential parent node, one or more second accumulated message success rates associated with transmitting messages from the first node to a target destination within the mesh network via the potential parent node and with receiving messages from the target destination via the potential parent node; and based on the second accumulated message success rates, selecting a new parent node from the plurality of potential parent nodes or maintaining the established parent node.

12. The one or more non-transitory computer-readable media of clause 11, wherein the one or more first accumulated message success rates includes an accumulated uplink message success rate that indicates a probability of successfully transmitting, from the first node, messages transmitted from the first node to the target destination via the established parent node.

13. The one or more non-transitory computer-readable media of clauses 11 or 12, wherein determining that a search for a different parent should be performed comprises determining that the accumulated uplink message success rate is lower than a threshold amount.

14. The one or more non-transitory computer-readable media of any of clauses 11-13, wherein the one or more first accumulated message success rates includes a combined accumulated message success rate that is based on an accumulated uplink message success rate that indicates a probability of successfully transmitting messages from the first node to the target destination via the established parent node and an accumulated downlink message success rate that indicates a probability of successfully receiving, at the first node, messages transmitted to the first node from the target destination via the established parent node.

15. The one or more non-transitory computer-readable media of any of clauses 11-14, wherein determining that a search for a different parent should be performed comprises determining that the combined accumulated message success rate is lower than a threshold amount.

16. The one or more non-transitory computer-readable media of any of clauses 11-15, wherein selecting the new parent node from the plurality of potential parent nodes or maintaining the established parent node comprises determining, for each potential parent node, a comparison message success rate from the one or more second accumulated message success rates; determining that a comparison message success rate associated with at least one potential parent node is greater than a comparison message success rate associated with the established parent node; and selecting the new parent node from the plurality of potential parent nodes.

17. The one or more non-transitory computer-readable media of any of clauses 11-16 wherein the established parent node is included in the plurality of potential parent nodes, and wherein maintaining the established parent node comprises selecting the established parent node from the plurality of potential parent nodes.

18. The one or more non-transitory computer-readable media of any of clauses 11-17 wherein selecting the new parent node from the plurality of potential parent nodes or maintaining the established parent node comprises selecting the new parent node and establishing a communication link with the new parent node.

19. The one or more non-transitory computer-readable media of any of clauses 11-18 wherein selecting the new parent node from the plurality of potential parent nodes or maintaining the established parent node comprises determining, for each potential parent node, whether the potential parent node satisfies one or more message success rate criteria.

20. In some embodiments, a system comprises a memory that stores instructions, and a processor that is coupled to the memory and, when executing the instructions, is configured to determine, at a first node, one or more first accumulated message success rates associated with transmitting messages from the first node to a target destination within a mesh network via an established parent node and with receiving messages from the target destination via the established parent node; determine, based on the one or more first accumulated message success rates, that a search for a different parent node should be performed; identify a plurality of potential parent nodes; compute, for each potential parent node, one or more second accumulated message success rates associated with transmitting messages from the first node to a target destination within the mesh network via the potential parent node and with receiving messages from the target destination via the potential parent node; and based on the second accumulated message success rates, select a new parent node from the plurality of potential parent nodes or maintaining the established parent node.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
   determining, at a first node in a mesh network, a first combined accumulated message success rate that is based on an accumulated uplink message success rate associated with transmitting messages from the first node to a target destination within the mesh network via an established parent node, a first offset value associated with the accumulated uplink message success rate, an accumulated downlink message success rate associated with receiving messages from the target destination via the established parent node, and a second offset value associated with the accumulated downlink message success rate;

determining, at the first node based on the first combined accumulated message success rate, that a search for a different parent node should be performed;

in response to determining that the search for the different parent node should be performed, at the first node, performing one or more communication operations to discover a plurality of nearby nodes;

computing, at the first node, one or more respective second combined accumulated message success rates that are based on respective accumulated uplink message success rates associated with transmitting messages from the first node to the target destination within the mesh network via a respective nearby node of the plurality of nearby nodes, respective first offset values associated with the respective accumulated uplink message success rates, respective accumulated downlink message success rates associated with receiving messages from the target destination via the respective nearby node, and respective second offset values associated with the respective accumulated downlink message success rates; and based on the one or more respective second combined accumulated message success rates, selecting, at the first node, a new parent node from the plurality of nearby nodes or maintaining the established parent node.

2. The method of claim 1, wherein the accumulated uplink message success rate indicates a probability of successfully transmitting, from the first node, messages transmitted from the first node to the target destination via the established parent node.

3. The method of claim 2, wherein determining that the search for the different parent node should be performed comprises determining that the accumulated uplink message success rate is lower than a threshold amount.

4. The method of claim 1, wherein the accumulated uplink message success rate indicates a probability of successfully transmitting messages from the first node to the target destination via the established parent node and the accumulated downlink message success rate indicates a probability of successfully receiving, at the first node, messages transmitted to the first node from the target destination via the established parent node.

5. The method of claim 1, wherein determining that the search for the different parent node should be performed comprises determining that the first combined accumulated message success rate is lower than a threshold amount.

6. The method of claim 1, wherein the first combined accumulated message success rate is determined based on a product of the accumulated uplink message success rate, as offset by the first offset value associated with the accumulated uplink message success rate, and the accumulated downlink message success rate, as offset by the second offset value associated with the accumulated downlink message success rate.

7. The method of claim 1, wherein determining the first combined accumulated message success rate comprises:

scaling the accumulated uplink message success rate by a first scaling factor to determine a scaled accumulated uplink message success rate;

adding the first offset value to the scaled accumulated uplink message success rate to determine an offset accumulated uplink message success rate;

scaling the accumulated downlink message success rate by a second scaling factor to determine a scaled accumulated downlink message success rate;

adding the second offset value to the scaled accumulated downlink message success rate to determine an offset accumulated downlink message success rate; and multiplying the offset accumulated uplink message success rate by the offset accumulated downlink message success rate to determine the first combined accumulated message success rate.

8. The method of claim 1, wherein selecting the new parent node from the plurality of nearby nodes or maintaining the established parent node comprises:

determining that a second combined accumulated message success rate associated with at least one nearby node is greater than the first combined accumulated message success rate associated with the established parent node; and selecting the new parent node from the plurality of nearby nodes.

9. The method of claim 1, wherein selecting the new parent node from the plurality of nearby nodes or maintaining the established parent node comprises:

determining that no second combined accumulated message success rate associated with the plurality of nearby nodes is greater than the first combined accumulated message success rate associated with the established parent node; and maintaining the established parent node.

10. The method of claim 1, wherein the established parent node is included in the plurality of nearby nodes, and wherein maintaining the established parent node comprises selecting the established parent node from the plurality of nearby nodes.

11. One or more non-transitory computer-readable media storing instructions which, when executed by one or more processors, cause the one or more processors to perform the steps of:

determining, at a first node, a first combined accumulated message success rate that is based on an accumulated uplink message success rate associated with transmitting messages from the first node to a target destination within a mesh network via an established parent node, a first offset value associated with the accumulated uplink message success rate, an accumulated downlink message success rate associated with receiving messages from the target destination via the established parent node, and a second offset value associated with the accumulated downlink message success rate;

determining, at the first node based on the first combined accumulated message success rates, that a search for a different parent node should be performed;

in response to determining that the search for the different parent node should be performed, at the first node, performing one or more communication operations to discover a plurality of nearby nodes;

computing, at the first node, one or more respective second combined accumulated message success rates that are based on respective accumulated uplink message success rates associated with transmitting messages from the first node to the target destination within the mesh network via a respective nearby node of the plurality of nearby nodes, respective first offset values associated with the respective accumulated uplink message success rates, respective accumulated downlink message success rates associated with receiving messages from the target destination via the respective nearby node, and respective second offset values associated with the respective accumulated downlink message success rates; and based on the one or more respective second combined accumulated message success rates, selecting, at the first node, a new parent node from the plurality of nearby nodes or maintaining the established parent node.

12. The one or more non-transitory computer-readable media of claim 11, wherein the accumulated uplink message success rate indicates a probability of successfully transmitting, from the first node, messages transmitted from the first node to the target destination via the established parent node.

13. The one or more non-transitory computer-readable media of claim 12, wherein determining that the search for the different parent node should be performed comprises determining that the accumulated uplink message success rate is lower than a threshold amount.

14. The one or more non-transitory computer-readable media of claim 11, wherein the accumulated uplink message success rate that indicates a probability of successfully transmitting messages from the first node to the target destination via the established parent node and the accumulated downlink message success rate indicates a probability of successfully receiving, at the first node, messages transmitted to the first node from the target destination via the established parent node.

15. The one or more non-transitory computer-readable media of claim 11, wherein determining that the search for the different parent node should be performed comprises determining that the first combined accumulated message success rate is lower than a threshold amount.

16. The one or more non-transitory computer-readable media of claim 11, wherein selecting the new parent node from the plurality of nearby nodes or maintaining the established parent node comprises:
   determining respective comparison message success rates from the one or more respective second combined accumulated message success rates for the plurality of nearby nodes;
   determining that a comparison message success rate associated with at least one nearby node is greater than a comparison message success rate associated with the established parent node; and
   selecting the new parent node from the plurality of nearby nodes.

17. The one or more non-transitory computer-readable media of claim 11 wherein the established parent node is included in the plurality of nearby nodes, and wherein maintaining the established parent node comprises selecting the established parent node from the plurality of nearby nodes.

18. The one or more non-transitory computer-readable media of claim 11 wherein selecting the new parent node from the plurality of nearby nodes or maintaining the established parent node comprises selecting the new parent node and establishing a communication link with the new parent node.

19. The one or more non-transitory computer-readable media of claim 11 wherein selecting the new parent node from the plurality of nearby nodes or maintaining the established parent node comprises determining, for each nearby node, whether the nearby node satisfies one or more message success rate criteria.

20. A system comprising:
   a memory that stores instructions, and
   a processor that is coupled to the memory and, when executing the instructions, is configured to:
   determine, at a first node, a first combined accumulated message success rate that is based on an accumulated uplink message success rate associated with transmitting messages from the first node to a target destination within a mesh network via an established parent node, a first offset value associated with the accumulated uplink message success rate, an accumulated downlink message success rate associated with receiving messages from the target destination via the established parent node, and a second offset value associated with the accumulated downlink message success rate;
   determine, at the first node, based on the first combined accumulated message success rates, that a search for a different parent node should be performed;
   in response to determining that the search for the different parent node should be performed, at the first node, perform one or more communication operations to discover a plurality of nearby nodes;
   compute, at the first node, one or more respective second combined accumulated message success rates that are based on respective accumulated uplink message success rates associated with transmitting messages from the first node to the target destination within the mesh network via a respective nearby node of the plurality of nearby nodes, respective first offset values associated with the respective accumulated uplink message success rates, respective accumulated downlink message success rates associated with receiving messages from the target destination via the nearby node, and respective second offset values associated with the respective accumulated downlink message success rates; and
   based on the one or more respective second combined accumulated message success rates, select, at the first node, a new parent node from the plurality of nearby nodes or maintaining the established parent node.

* * * * *